(12) United States Patent
Cheung et al.

(10) Patent No.: US 10,303,445 B2
(45) Date of Patent: May 28, 2019

(54) NETWORK SERVICE PROVIDING METHOD AND NETWORK SERVICE STATION USING SAME

(71) Applicant: ABLE WORLD INTERNATIONAL LIMITED, Tortola (VG)

(72) Inventors: Wai-Tung Cheung, Hong Kong (HK); Chun-Hsiao Lin, New Taipei (TW); Ho-Cheung Cheung, Hong Kong (HK)

(73) Assignee: ABLE WORLD INTERNATIONAL LIMITED, Tortola (VG)

( * ) Notice: Subject to any disclaimer, the term of this patent is extended or adjusted under 35 U.S.C. 154(b) by 104 days.

(21) Appl. No.: 15/535,332

(22) PCT Filed: Dec. 11, 2015

(86) PCT No.: PCT/CN2015/097138
§ 371 (c)(1),
(2) Date: Sep. 15, 2017

(87) PCT Pub. No.: WO2016/091212
PCT Pub. Date: Jun. 16, 2016

(65) Prior Publication Data
US 2018/0046439 A1   Feb. 15, 2018

Related U.S. Application Data

(63) Continuation of application No. 14/577,772, filed on Dec. 19, 2014, now Pat. No. 9,626,157, which is a (Continued)

(30) Foreign Application Priority Data

Dec. 12, 2014 (CN) .......................... 2014 1 0768564
Dec. 18, 2014 (CN) .......................... 2014 1 0796528
(Continued)

(51) Int. Cl.
*G06F 8/20* (2018.01)
*G06F 8/34* (2018.01)
(Continued)

(52) U.S. Cl.
CPC .................. *G06F 8/34* (2013.01); *G06F 8/20* (2013.01); *G06F 8/35* (2013.01); *G06F 8/38* (2013.01);
(Continued)

(58) Field of Classification Search
CPC ..... G06F 8/20; G06F 8/34; G06F 8/35; G06F 8/38; G06F 9/451; G06F 21/31; H04L 63/102; H04L 67/12
(Continued)

(56) References Cited

U.S. PATENT DOCUMENTS 6,437,803 B1 * 8/2002 Panasyuk ................ G06F 9/541
715/733
2005/0120349 A1 * 6/2005 Wright .................... G06F 9/451
718/102
(Continued)

*Primary Examiner* — Qing Chen
(74) *Attorney, Agent, or Firm* — WPAT, PC

(57) ABSTRACT

A network service providing method is provided. Firstly, a network service platform is provided for allowing a user to create a workspace in a network service platform. At least one unified matter is allowed to be added to or removed from a projectable space instance that is for modeling the workspace. The projectable space instance is installed in a back-end system. When the projectable space instance is acquired by at least one machine through a URI, the projectable space instance is parsed by a projector, so that a projected workspace corresponding to the workspace is built in the at least one machine. The user and/or a second user interacts with the projected workspace, or a function of the at least one machine is dynamically configured through the projected workspace. A network service station is also provided.

17 Claims, 22 Drawing Sheets

Related U.S. Application Data continuation-in-part of application No. 14/324,069, filed on Jul. 3, 2014, now Pat. No. 9,134,963.

(60) Provisional application No. 62/109,324, filed on Jan. 29, 2015, provisional application No. 62/102,360, filed on Jan. 12, 2015.

(30) Foreign Application Priority Data

| Dec. 23, 2014 | (CN) | .......................... | 2014 1 0814138 |
|---|---|---|---|
| Jan. 4, 2015 | (CN) | .......................... | 2015 1 0003717 |
| Jan. 4, 2015 | (CN) | .......................... | 2015 1 0003718 |
| Jan. 4, 2015 | (CN) | .......................... | 2015 1 0003852 |
| Jan. 4, 2015 | (CN) | .......................... | 2015 1 0003853 |
| Jan. 20, 2015 | (CN) | .......................... | 2015 1 0029235 |
| Feb. 5, 2015 | (CN) | .......................... | 2015 1 0060730 |
| Feb. 5, 2015 | (CN) | .......................... | 2015 1 0061132 |
| Feb. 5, 2015 | (CN) | .......................... | 2015 1 0061134 |
| Feb. 16, 2015 | (CN) | .......................... | 2015 1 0085607 |

(51) Int. Cl.

| *G06F 8/35* | (2018.01) |
|---|---|
| *G06F 8/38* | (2018.01) |
| *G06F 17/21* | (2006.01) |
| *G06F 21/31* | (2013.01) |
| *G06F 9/451* | (2018.01) |
| *H04L 29/06* | (2006.01) |
| *H04L 29/08* | (2006.01) |

(52) U.S. Cl.
CPC ............ *G06F 9/451* (2018.02); *G06F 17/212* (2013.01); *G06F 21/31* (2013.01); *H04L 67/12* (2013.01); *H04L 63/102* (2013.01)

(58) Field of Classification Search
USPC ................ 717/100, 104, 105; 719/331, 332; 726/17–20
See application file for complete search history.

(56) References Cited

U.S. PATENT DOCUMENTS

| 2005/0151835 | A1* | 7/2005 | Guo ........................ | H04N 7/147 348/14.08 |
|---|---|---|---|---|
| 2007/0055941 | A1* | 3/2007 | Bhakta ................... | G06F 3/1454 715/739 |
| 2007/0113066 | A1* | 5/2007 | Samba ...................... | G06F 8/61 713/1 |
| 2007/0124374 | A1* | 5/2007 | Arun ....................... | G06Q 10/10 709/204 |
| 2009/0006553 | A1* | 1/2009 | Grandhi ............ | G06F 17/30171 709/205 |
| 2010/0313199 | A1* | 12/2010 | Chen ..................... | G06F 9/5055 717/177 |
| 2011/0197147 | A1* | 8/2011 | Fai ........................ | G06F 1/1639 715/753 |
| 2012/0054640 | A1* | 3/2012 | Nancke-Krogh ..... | G06F 9/4843 715/751 |
| 2012/0060204 | A1* | 3/2012 | Panasyuk ................ | G06F 21/31 726/3 |
| 2012/0151373 | A1* | 6/2012 | Kominac .......... | G06F 17/30905 715/740 |
| 2013/0246901 | A1* | 9/2013 | Massand ................ | G06F 17/24 715/229 |
| 2014/0020079 | A1* | 1/2014 | Lu ....................... | H04L 63/0815 726/8 |

* cited by examiner

NETWORK SERVICE PROVIDING METHOD AND NETWORK SERVICE STATION USING SAME

FIELD OF THE INVENTION

The present invention relates to a service providing method and a service station, and more particularly to a network service providing method and a network service station using the method.

BACKGROUND OF THE INVENTION

In today's convenience daily life, people are accustomed to use an electronic device with computational capability to achieve various kinds of applications. For example, these applications include working, file processing, entertainment, social communication, and so on. With development of science and technology, information can be propagated more quickly. Accordingly, various network service platforms, operating systems and software tools have been have been developed for people to use and brought more efficient lives to the users. Especially in the post-PC era, the conventional desktop computers, tablet computers, mobile phones or other mobile devices still make people to implement tasks whenever and wherever they are, and people over the world communicate with each other to transmit and share information through the internet.

With increasing development of the internet, the American Google company provides more and more network services to the users. For example, the user may create a personalized information page through an iGoogle platform, which is provided by Google. Moreover, the user may arrange required widgets in a collaborative working platform that is provided by Google in order to perform collaborative work with other users. However, the iGoogle platform or the collaborative working platform still has some drawbacks. For example, the user is only allowed to select and arrange at least one tool and/or information in a workspace of the platform through limited options. The limited options indicate plural widgets that are arranged in various Google platforms and provided to users. While the platform is used, any tool and/or information that is in the internet but incompatible with the Google platforms cannot be arbitrarily combined together into the workspace of the platform by the user. Since Google has not developed a satisfactory unifying process for allowing any information and any tool in the internet to be combined together into the Google platform, the tool and/or information cannot be arbitrarily combined together into the workspace of the Google platform by the user.

Although the network services provided by the network service providers become more diverse, some inconvenient and perplexing problems below occur. Firstly, a large number of information units and tools in the same or different formats are distributed in different information sources. Since the information units and the tools in different formats are usually incompatible, it is difficult to integrate the information units and the tools that are obtained in a single workspace and have different formats. Secondly, various kinds of network service platforms, operating systems and software components are almost developed by different developers, and usually independent from and incompatible with each other. Consequently, while a task is performed, it is unable to operate specified functions of different network service platforms, operating systems and software through a single user interface. Thirdly, the existing hardware components or software components are developed in view of "personal devices". That is, a large number of data stations with obvious barriers in the internet become obstruction for many people to work collaboratively. Under this circumstance, the purpose of having no international limitation in the network cannot be successfully achieved.

Therefore, the network service providing method needs to be further improved.

SUMMARY OF THE INVENTION

An object of the present invention provides a network service providing method. The network service providing method allows a user to create a workspace to perform a specified task. Moreover, any information or any tool is allowed to be combined into the workspace that is created by the user. Since the workspace is highly transmittable, the workspace can be projected to at least one machine.

Another object of the present invention provides a network service station for providing the network service providing method.

In accordance with an aspect of the present invention, there is provided a network service providing method. Firstly, a network service platform is provided for allowing a user to create a workspace in the network service platform. At least one unified matter is allowed to be added to or removed from a projectable space instance that is used for modeling the workspace. The projectable space instance is installed in a back-end system. When the projectable space instance is acquired by at least one machine through a uniform resource identifier (URI), the projectable space instance is parsed by a projector, so that a projected workspace corresponding to the workspace is built in the at least one machine. The user and/or a second user interacts with the projected workspace, or a function of the at least one machine is dynamically configured through the projected workspace.

In an embodiment, the projectable space instance is instantiated by a unified script, and the unified script is defined to arrange the at least one unified matter.

In an embodiment, the unified script is declared by a document type definition (DTD), an extensible markup language (XML) Schema, a structured language or a structured protocol.

In an embodiment, the projectable space instance is an object, an extensible markup language document, or an instance which is instantiated with a structured language or a structured protocol.

In an embodiment, the projector is provided by the network service platform or a browser.

In an embodiment, the projector is loaded into an engine that provides a compatible environment to execute the projector.

In an embodiment, the at least one unified matter includes at least one Matterizer, at least one unified tool and/or at least one unified information unit, wherein the at least one unified information unit and/or the at least one unified tool is inputted into the projected workspace through the at least one Matterizer.

In an embodiment, the at least one unified matter is produced after at least one original information obtained from at least one information source is unified by at least one Matterizer.

In an embodiment, at least one original tool corresponding to the at least one unified tool includes a utility, a widget, an agent, an application, a service or any executable element accessible from a corresponding machine or a server; and/or at least one original information corresponding to the at least one unified information unit includes a file, a web page, a database row, a policy, a rule, a policy or any information accessible from a corresponding machine or a server.

In an embodiment, the at least one unified matter is combined into the workspace when the workspace is created by the user, and/or the at least one unified matter is allowed to be added to or removed from the projected workspace when at least one of the user and the second user interacts with the projected workspace.

In an embodiment, the at least one machine acquires the uniform resource identifier through at least one channel.

In an embodiment, the at least one channel includes an e-mail, a social network, a blog, a web site and/or a chat communication software.

In an embodiment, the at least one unified matter includes at least one unified tool for driving at least one electronic device. When at least one of the user and the second user operates the at least one machine, the at least one unified tool drives the at least one electronic device to execute at least one task.

In an embodiment, the at least one unified matter includes a control and management tool and plural unified tools for driving plural electronic devices. When the projected workspace built in the at least one machine is operated, the control and management tool realizes at least one status information of at least one electronic device of the plural electronic devices through the plural unified tools and controls other electronic devices of the plural electronic devices to perform at least one task corresponding to the status information.

In an embodiment, the at least one unified matter includes an analyzing and controlling tool, a data-monitoring tool and at least one unified tool for driving at least one electronic device. When the projected workspace built in the at least one machine is operated, the data-monitoring tool acquires a data of the at least one electronic device through the at least one unified tool, and the analyzing and controlling tool analyzes the data. The analyzing and controlling tool controls the at least one electronic device through the at least one unified tool according to a result of the analyzing the data.

In an embodiment, the network service platform further allows the user and/or the second user to establish a home system to host and manage the projected workspace.

In an embodiment, when the user interacts with the projected workspace network service platform, a direct-link relationship between the workspace and the user is established through the network service platform. A social network is established according to plural direct-link relationships.

In an embodiment, the at least one unified matter is added to the projectable space instance according to an operational demand, and the projected workspace is equipped with the at least one unified matter according to the projectable space instance, so that at least two of the user, the second user and the at least one machine work collaboratively.

In an embodiment, if one of the user and the second user performs an operation on the corresponding projected workspace to result in a change, the projected workspace of the other of the user and the second user is synchronously changed according to a synchronization setting.

In an embodiment, a process of preloading a concerned web page is triggered through the projected workspace; and/or a collection management rule about the workspace is added to the projectable space instance, and the at least one unified matter is collected by the projected workspace according to the collection management rule.

In an embodiment, the user and/or the second user is allowed to create a home system in the network service platform. The projected workspace, a personal relationship and/or a personal property is managed and/or accessed by the home system.

In an embodiment, the uniform resource identifier contains an instruction code. When the instruction code is executed in the projected workspace, an interactive operation is performed.

In accordance with another aspect of the present invention, there is provided a network service station. The network service station includes a back-end system. The back-end system hosts a network service platform for allowing a user to create a workspace. A projectable space instance for modeling the workspace is installed in the back-end system. At least one unified matter is allowed to be added to or removed from a projectable space instance. When the projectable space instance is acquired by at least one machine through a uniform resource identifier (URI), the projectable space instance is parsed by a projector, so that a projected workspace corresponding to the workspace is built in the at least one machine. The user and/or a second user interacts with the projected workspace, or a function of the at least one machine is dynamically configured through the projected workspace.

In an embodiment, the projectable space instance is instantiated by a unified script, and the unified script is defined to arrange the at least one unified matter.

In an embodiment, the unified script is declared by a document type definition (DTD), an extensible markup language (XML) Schema, a structured language or a structured protocol.

In an embodiment, the projectable space instance is an object, an extensible markup language document, or an instance which is instantiated with a structured language or a structured protocol.

In an embodiment, the projector is provided by the network service platform or a browser.

In an embodiment, the projector is loaded into an engine that provides a compatible environment to execute the projector.

In an embodiment, the at least one unified matter includes at least one Matterizer, at least one unified tool and/or at least one unified information unit, wherein the at least one unified information unit and/or the at least one unified tool is inputted into the projected workspace through the at least one Matterizer.

In an embodiment, the at least one unified matter is produced after at least one original information obtained from at least one information source is unified by at least one Matterizer.

In an embodiment, at least one original tool corresponding to the at least one unified tool includes a utility, a widget, an agent, an application, a service or any executable element accessible from a corresponding machine or a server; and/or at least one original information corresponding to the at least one unified information unit includes a file, a web page, a database row, a policy, a rule, a policy or any information accessible from a corresponding machine or a server.

In an embodiment, the at least one unified matter is combined into the workspace when the workspace is created by the user, and/or the at least one unified matter is allowed to be added to or removed from the projected workspace when at least one of the user and the second user interacts with the projected workspace.

In an embodiment, the at least one machine acquires the uniform resource identifier through at least one channel.

In an embodiment, the at least one unified matter includes at least one unified tool for driving at least one electronic device. When at least one of the user and the second user operates the at least one machine, the at least one unified tool drives the at least one electronic device to execute at least one task.

In an embodiment, the at least one unified matter includes a control and management tool and plural unified tools for driving plural electronic devices. When the projected workspace built in the at least one machine is operated, the control and management tool realizes at least one status information of at least one electronic device of the plural electronic devices through the plural unified tools and controls other electronic devices of the plural electronic devices to perform at least one task corresponding to the status information.

In an embodiment, the at least one unified matter includes an analyzing and controlling tool, a data-monitoring tool and at least one unified tool for driving at least one electronic device. When the projected workspace built in the at least one machine is operated, the data-monitoring tool acquires a data of the at least one electronic device through the at least one unified tool, and the analyzing and controlling tool analyzes the data. The analyzing and controlling tool controls the at least one electronic device through the at least one unified tool according to a result of the analyzing the data.

In an embodiment, the network service platform further allows the user and/or the second user to establish a home system to host and manage the projected workspace.

In an embodiment, when the user interacts with the projected workspace network service platform, a direct-link relationship between the workspace and the user is established through the network service platform. A social network is established according to plural direct-link relationships.

In an embodiment, the at least one unified matter is added to the projectable space instance according to an operational demand, and the projected workspace is equipped with the at least one unified matter according to the projectable space instance, so that at least two of the user, the second user and the at least one machine work collaboratively.

In an embodiment, a process of preloading a concerned web page is triggered through the projected workspace; and/or a collection management rule about the workspace is added to the projectable space instance, and the at least one unified matter is collected by the projected workspace according to the collection management rule.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention is more fully appreciated by reference to the following description, including the following glossary of terms and the concluding examples. For the sake of brevity, the disclosures of the publications, including patents, cited in this specification are herein incorporated by reference.

The examples below are non-limiting and are merely representative of various aspects and features of the present invention. The term "information source" used herein is defined as a sequence of symbols that can be interpreted as a message in the most limited technical meaning. And the message is used for organizing and labeling information. For example, the information source includes website (such as internet service), intranet, social network, software, electronic book, database and other media of information (such as storage media of non-transitory computer or storage media of mobile device). The term "original information" used herein is a file, a web page, a database row, a policy, a rule or any data accessible in corresponding machines and servers, but is not limited thereto. The term "original tool" used herein is a utility, a widget, an intelligent agent, an application, a service or any executable component accessible in corresponding machines and servers, but is not limited thereto. It is noted that the information sources, the original information and the original tool are not restricted to the above examples.

Moreover, "original information" and "original tool" are implementation examples of "original matters" used herein. In accordance with the present invention, a plurality of "original matters" from identical or different "information sources" are modeled to a plurality of "unified matters" by a unifying method. Consequently, the "unified matters" in the same execution environment are compatible with each other and cooperate to perform a specified task. The "unified tool" and the "unified information unit" are implementation examples of the "unified matters". Moreover, the term "Matterizer" used herein is a means, a device or a program code to perform the unifying process.

In an embodiment, the above unifying method comprises steps of: modeling at least one original information obtained from at least one information source of multiple information sources into a unified information unit with one unified data model via re-organizing the original information, and/or modeling at least one original tool obtained from at least one information source of multiple information sources into a unified tool with another unified data model via re-organizing the original tool. The one unified data model and another unified data model could be identical or different, and the unifying method described above could be completed through a matterizer.

Figure 1:
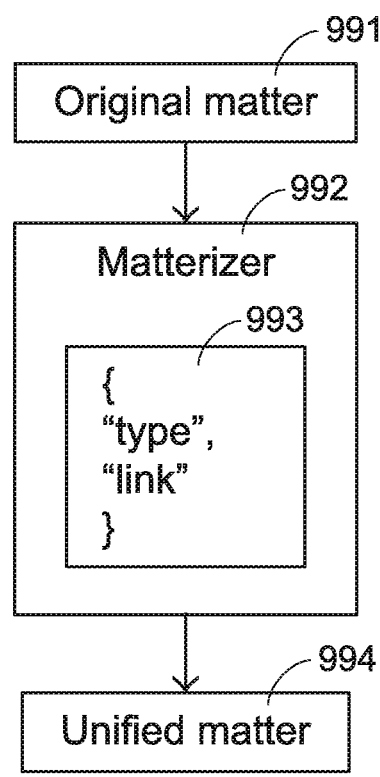
FIG. 1 is a schematic diagram illustrating an implementation concept of a unifying method according to an embodiment.

Please refer to FIG. 1. FIG. 1 is a schematic diagram illustrating an implementation concept of a unifying method according to an embodiment. As shown in FIG. 1, the matterizer 992 re-organizes an attribute and a link of an original matter 991 with a unified data model 993, and thus models the original matter 991 into a unified matter 994. Consequently, the basic attribute of the unified matter 994 include a type of the original matter 994 and a link indicating where the original matter 994 is located.

In this embodiment, the original matter 991 at least includes an original information (not shown) or an original tool (not shown), but is not limited thereto. In the above unifying method, if the attribute accessible from the original information corresponds to the attribute to be unified in the unified information unit, the unified information unit is directly produced through the matterizer 992. If the attribute accessible from the original information does not correspond to the attribute to be unified in the unified information unit, the original information is firstly re-defined by logically re-organizing the attributes and the link of the original information, and then the original information is converted into a new original information with the attributes which correspond to attributes to be unified in the unified information unit. Consequently, the unified information unit is indirectly produced.

Moreover, if the original tool is compatible with the working environment of the workspace, the unified tool is directly produced by the matterizer 992. On the other hand, if the original tool is incompatible with the working environment of the workspace, the unified tool is indirectly produced via an adapter and/or a software development kit (SDK) of the original tool to drive the original tool. The adapter provides an interface implementation compatible with the working environment.

Herein, "the descriptions of the unifying method", "the methods of obtaining the unified matters" and "the descriptions of the matterizer" may be referred to the U.S. patent application Ser. No. 14/324,069, entitled "A method of unifying information and tool from a plurality of information sources", and also referred to the China Patent Application No. 201410768564.X, which claims the benefit of priority to the U.S. patent application Ser. No. 14/324,069 and is entitled "A method of unifying information and tool from a plurality of information sources and computer product and device using the method". The detailed descriptions thereof are omitted.

The above unifying method is presented herein for purpose of illustration and description only. The method of unifying a plurality of original matters from different information sources is not restricted. However, those skilled in the art will readily observe that numerous modifications and alterations may be made while retaining the teachings of the invention.

Hereinafter, two other unifying methods will be illustrated. The first unifying method is applied to a method of unifying the information of Garmin satellite navigation. Through a point-of-interest (POI) function of the Garmin satellite navigation, the method of unifying the information is employed to unify the imported original point information (i.e., an original information) into the corresponding unified point information (i.e., a unified information unit). The second unifying method is applied to a method of unifying the tool of an Android system. The Android system is a Linux-based open source mobile operating system. However, most application programs (i.e., original tools) are written in the Java programming language. Consequently, the application program (i.e., the original tool) written in the Java programming language can be modelled into a unified application program (i.e., the unified tool) compatible with the Android system so as to be executed in the Android system.

Figure 6:
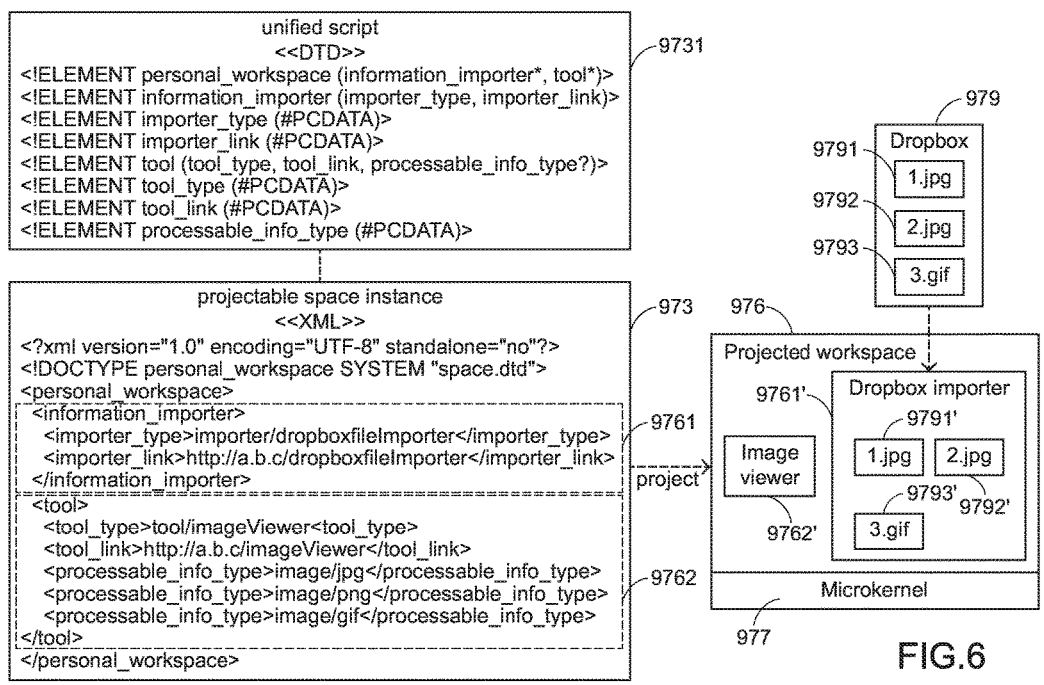
FIG. 6 is a schematic diagram illustrating the relationship between a projectable space instance as shown in FIG. 4 and a projected workspace as shown in FIG. 5B.

The term "workspace" used herein is a working environment for providing interactions between the at least one matterizer, the at least one tool and/or the at least one information so as to implement a specified task. Moreover, the at least one tool and/or at least one information can be imported into the workspace through the at least one matterizer. However, the way of importing the information and/or tool into the workspace is not restricted. Hereinafter, information importers such as the information importers 9881, 9882 and 9883 of FIG. 2 and the Dropbox importer 9761' of FIG. 6 are some examples of the matterizer. The term "unified script" used herein is an intermediate language to implement the workspace. Moreover, via the "unified script", the at least one matterizer, the at least one tool and/or the at least one information can be provided to the workspace (e.g., built in or plugged in the workspace).

In an embodiment, the above at least one information is a unified information unit which is produced after at least one original information obtained from at least one information source is unified, and the above at least one tool is a unified tool which is produced after at least one original tool obtained from at least one information source is unified. Moreover, according to different tasks, the required unified information unit and/or the required unified tool from the corresponding information source can be added to the personal workspace (e.g., built in or plugged in the personal workspace). In other words, the "workspace" is a user-orientated "personal workspace".

Figure 2:
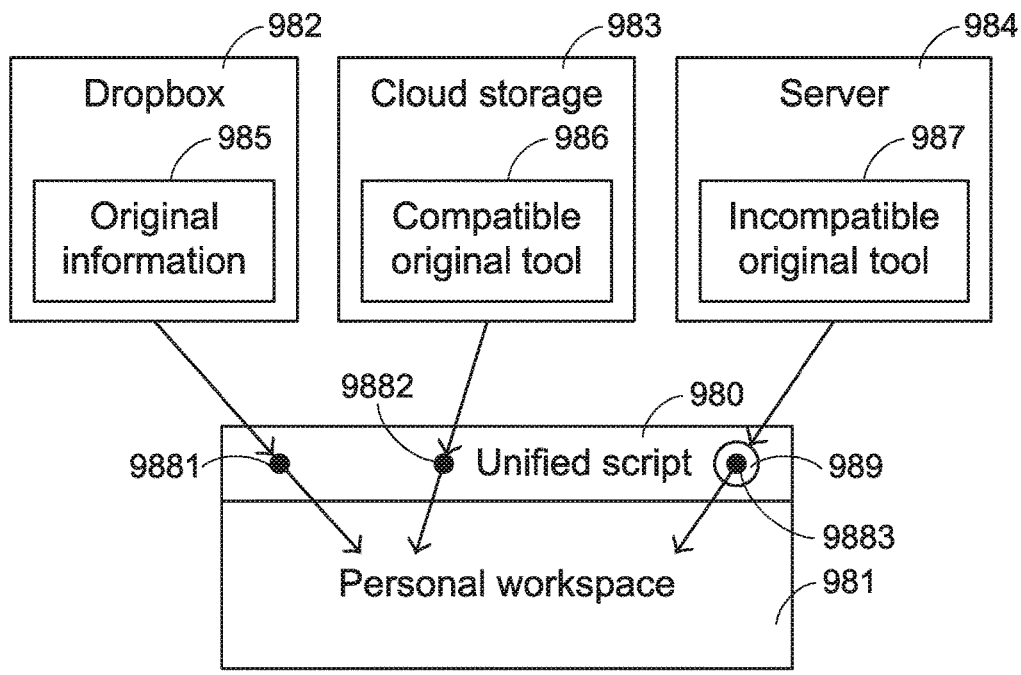
FIG. 2 is a schematic diagram illustrating an implementation concept of using the unified script as an intermediate language for implementing the personal workspace.
Figure 3:
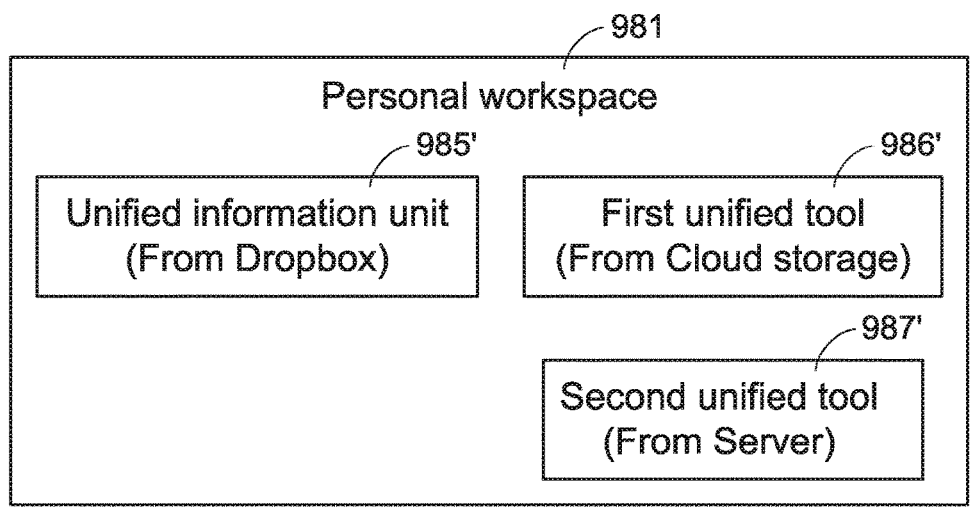
FIG. 3 is a schematic diagram illustrating a preferred configuration of a personal workspace.

Please refer to FIG. 2 and FIG. 3. FIG. 2 is a schematic diagram illustrating an implementation concept of using the unified script as an intermediate language for implementing the workspace. FIG. 3 is a schematic diagram illustrating a preferred configuration of a personal workspace. As shown in FIG. 2 and FIG. 3, a unified information unit 985' corresponding to an original information 985 in Dropbox 982, a first unified tool 986' corresponding to a compatible original tool 986 in a cloud storage 983 and a second unified tool 987' corresponding to an incompatible original tool 987 in a server 984 are combined together into a personal workspace 981 according to the required tasks. In particular, a unified script 980 which is regarded as an intermediate language for implementing the personal workspace 981 is firstly compiled, and then an information importer 9881 of the Dropbox 982, an information importer 9882 of the cloud storage 983 and an information importer 9883 of the server 984 are configured through the unified script 980. Moreover, after the original information 985 in the Dropbox 982 is unified into the unified information unit 985' by the information importer 9881, the unified information unit 985' is imported into the personal workspace 981.

As shown in FIG. 2 and FIG. 3, the original tool stored in the cloud storage 983 is the compatible original tool 986, which is compatible with the component architecture of the unified tool in the personal workspace 981. Moreover, the first unified tool 986' corresponding to the compatible original tool 986 is directly provided to the personal workspace 981 through the information importer 9882 of the unified script 980.

As shown in FIG. 2 and FIG. 3, the original tool stored in the server 984 is the incompatible original tool 987, which is incompatible with the component architecture of the unified tool in the personal workspace 981. Moreover, the second unified tool 987' corresponding to the incompatible original tool 987 is provided to the personal workspace 981 through the compatible adapter 989 and the information importer 9883 of the unified script 980.

As shown in FIG. 3, the user can configure and arrange (e.g., group or place) the unified information unit 985', the first unified tool 986' and the second unified tool 987' in a specific area of the personal workspace 981 according to the practical requirements. Moreover, according to the operational relationship between the unified tool and the unified information unit (e.g., the clicking or dragging actions between the two), the user can perform specified tasks by using the unified tool to access or control the corresponding unified information unit.

Herein, "the descriptions of using the unified script as the intermediate language for implementing the personal workspace" and "the descriptions of allowing the required unified information unit and/or the required unified tool from the corresponding information sources to be arbitrarily combined together into the personal workspace according to the practical requirements" may be referred to the U.S. patent application Ser. No. 14/325,466, entitled "Method for performing task on unified information units in a personal workspace", and also referred to the China Patent Application No. 201410768564.X, which claims the benefit of priority to the U.S. patent application Ser. Nos. 14/324,069 and 14/325,466 and is entitled "A method of combining unified matters in a personal workspace and computer product and device using the method". The detailed descriptions thereof are omitted.

The above personal workspace is presented herein for purpose of illustration and description only. It is noted that the workspace used in the present invention is not restricted. For example, the unified script as the intermediate language for implementing the workspace can be previously edited. Consequently, the workspace has the default matterizer, the default information and/or the default tool. This workspace is not limited to be operated by a single user. According to the practical requirements, this workspace can be operated by multiple users at the same time or at different times.

Moreover, the "workspace" used herein is obtained by "a method of projecting a workspace" to any electronic device with computational capability. An example of the electronic device includes but is not limited to a mobile phone, a tablet computer, a notebook computer or a desktop computer. Consequently, the "projected workspace" can be operated by any user through any electronic device with computational capability.

In an embodiment, the method of projecting the workspace comprises the following steps. Firstly, a projectable space instance instantiated by the unified script is obtained through a uniform resource identifier (URI). As mentioned above, the unified script is defined to configure at least one of the matterizer, the information and the tool to model the workspace. Moreover, the projectable space instance is used to build the projected workspace corresponding to the workspace, and thus provide an interface for operating at least one of the matterizer, the information and the tool to implement a task. Then, a projector parses the projectable space instance and build a working environment to configure at least one of the matterizer, the information and the tool so as to execute the projected workspace for providing interactions between at least one user and the projected workspace.

The projector is acquired from a remote data station, the projectable space instance or a preloaded application program, and loaded into an engine for providing a compatible environment to execute the projector. An example of the engine includes but is not limited to a Javascript engine, a Windows application or a Linux application. Preferably but not exclusively, the unified script can be declared by a document type definition (DTD), an extensible markup language (XML) Schema, a structured language or a structured protocol. Preferably but not exclusively, the projectable space instance is an object, an extensible markup language (XML) document, or an instance instantiated with a structured language or a structured protocol.

Figure 4:
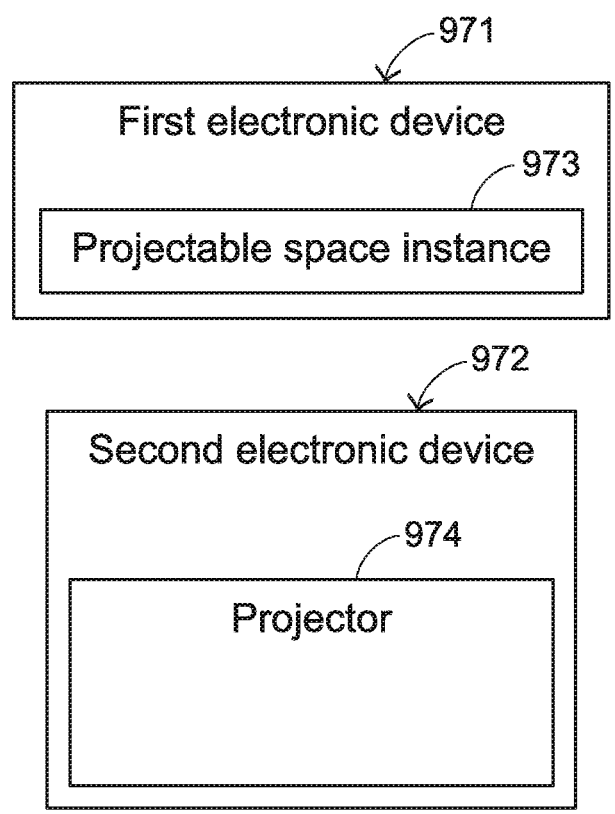
FIG. 4 is a schematic diagram illustrating an initial state of the method of projecting the workspace according to an embodiment of the present invention.
Figure 5A:
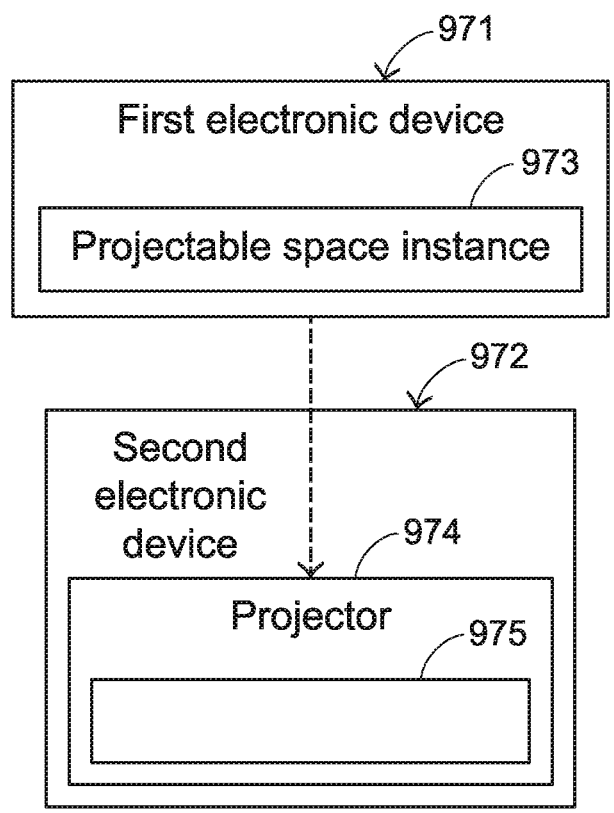
FIG. 5A is a schematic diagram illustrating operating concepts of the method of projecting the workspace as shown in FIG. 4.
Figure 5B:
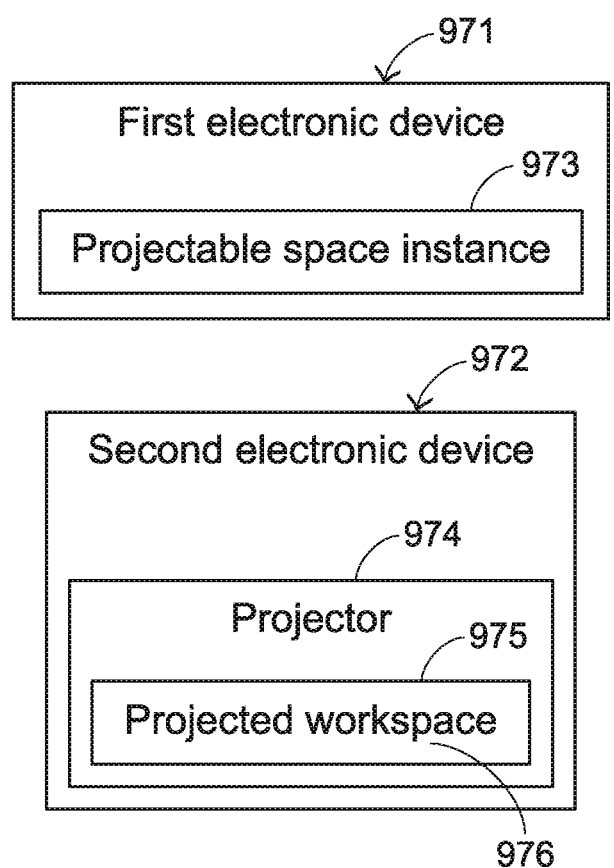
FIG. 5B is a schematic diagram illustrating operating concepts of the method of projecting the workspace as shown in FIG. 4.

Please refer to FIG. 4, FIG. 5A, FIG. 5B and FIG. 6. FIG. 4 is a schematic diagram illustrating an initial state of the method of projecting the workspace according to an embodiment of the present invention. FIGS. 5A and 5B are schematic diagrams illustrating operating concepts of the method of projecting the workspace as shown in FIG. 4. FIG. 6 is a schematic diagram illustrating the relationship between a projectable space instance as shown in FIG. 4 and a projected workspace as shown in FIG. 5B.

In the initial state of FIG. 4, a first electronic device 971 and a second electronic device 972 are in communication with each other (e.g., through network connection). Moreover, the first electronic device 971 stores a projectable space instance 973, and the second electronic device 972 has a built-in projector 974.

In this embodiment, the unified script 9731 is declared by a document type definition (DTD) and defined to configure at least one information importer (i.e., an example of the matterizer), at least one unified information unit and/or at least one unified tool to model a workspace, and the projectable space instance 973 is an instance instantiated with the extensible markup language (XML). As shown in FIG. 6, the projectable space instance 973 is used for building a projected workspace 976 corresponding to the workspace. Moreover, the information importer, the unified information and/or the unified tool is allowed to be added to or removed from the projectable space instance 973.

The projector 974 of the second electronic device 972 will build a working environment 975 in the second electronic device 972 for executing the projected workspace 976. In addition, the projector 974 provides a microkernel 977 (see FIG. 6) to the working environment 975 for equipping at least one information importer, at least one unified information and/or at least one unified tool that will be added to the projected workspace 976. When the second electronic device 972 acquires the projectable space instance 973 from the first electronic device 971 through a URI, the projector 974 of the second electronic device 972 starts to parse the projectable space instance 973 (see FIG. 5A). After the projectable space instance 973 is parsed by the projector 974, the projected workspace 976 is built in the working environment 975 according to parsed contents of the projectable space instance 973 (see FIG. 5B). Accordingly, a user of the second electronic device 972 can interact with the projected workspace 976 through the second electronic device 972 so as to perform related tasks.

The relationships between the unified script 9731, the projectable space instance 973 and the projected workspace 976 will be illustrated in more detailed through a usage situation as shown in FIG. 6. The usage situation as shown in FIG. 6 is related to a process of building a projected workspace that is capable of accessing jpg format image files and gif format image files from a specified internet space and allowing the image files to be viewed by a user. In this usage situation, the unified script 9731 is declared by the Document Type Definition (DTD), and the projectable space instance 973 is instantiated with XML.

Moreover, an information importer and a unified tool are added into the projectable space instance 973, and at least one unified information unit corresponding to the original information is imported into the projected workspace 976 through the information importer. In this usage situation, the information importer is a Dropbox importer. The information of the Dropbox importer is disclosed in the dashed line frame 9761 of FIG. 6. The original information includes a jpg format image file 9791, a jpg format image file 9792 and a gif format image file 9793 in Dropbox 979 (i.e., an information source). The unified information units includes a unified jpg format image file 9791', a unified jpg format image file 9792' and a unified gif format image file 9793', which will be described later. The unified tool is an image viewer for accessing image files which are imported into the projected workspace 976. The information of the image viewer is disclosed in the dashed line frame 9762 of FIG. 6.

As mentioned above, the projected workspace 976 is built after the projectable space instance 973 is parsed by the projector 974 of the second electronic device 972. In this embodiment, the Dropbox importer 9761' corresponding to the dashed line frame 9761 and the image viewer 9762' corresponding to the dashed line frame 9762 are configured in the projected workspace 976. Moreover, the jpg format image file 9791, the jpg format image file 9792 and the gif format image file 9793 in Dropbox 979 are unified and imported into the projected workspace 976 by the Dropbox importer 9761'. Consequently, the unified jpg format image file 9791' corresponding to the jpg format image file 9791, the unified jpg format image file 9792' corresponding to the jpg format image file 9792 and the unified gif format image file 9793' corresponding to the gif format image file 9793 are displayed on the projected workspace 976. When the user of the second electronic device 972 manipulates any of the unified image files 9791', 9792' and 9793' by any specified operating means (such as an action of clicking any of the unified images files 9791', 9792' and 9793' or an action of dragging and dropping any of the image files 9791', 9792' and 9793' to the image viewer 9762'), the image viewer 9762' will access the contents of the corresponding unified image files 9791', 9792' or 9793' to allow the unified image files 9791', 9792' or 9793' to be viewed by the user. Moreover, the Dropbox importer 9761' and the image viewer 9762' mentioned above are equipped by the microkernel 977.

It is noted that the URI of the projectable space instance 973 may be a HTTP (hypertext transfer protocol) URI or a FTP (file transfer protocol) URI. In case that the first electronic device 971 and the second electronic device 972 are integrated into one device, the URI of the projectable space instance 973 can also be a local file URI. However, the types of the URI of the projectable space instance 973 are not restricted.

Herein, "the descriptions of the method of projecting the workspace" may be referred to the U.S. patent application Ser. No. 14/577,772, entitled "Method of projecting a workspace and system using the same", and also referred to the China Patent Application No. 201410814138.5, which claims the benefit of priority to the U.S. patent application Ser. Nos. 14/324,069, 14/325,466 and 14/577,772 and is entitled "Method of projecting a workspace and system using the same". The detailed descriptions thereof are omitted.

The above method of projecting the workspace to any electronic device with computational capability is presented herein for purpose of illustration and description only. The method of projecting the workspace to any electronic device with computational capability is not restricted. However, those skilled in the art will readily observe that numerous modifications and alterations may be made while retaining the teachings of the invention. Moreover, any workspace can be projected to any electronic device with computational capability. That is, any workspace can be delivered to any electronic device with computational capability. Consequently, the workspace is also a working platform for allowing multiple cooperators to work collaboratively.

Figure 7:
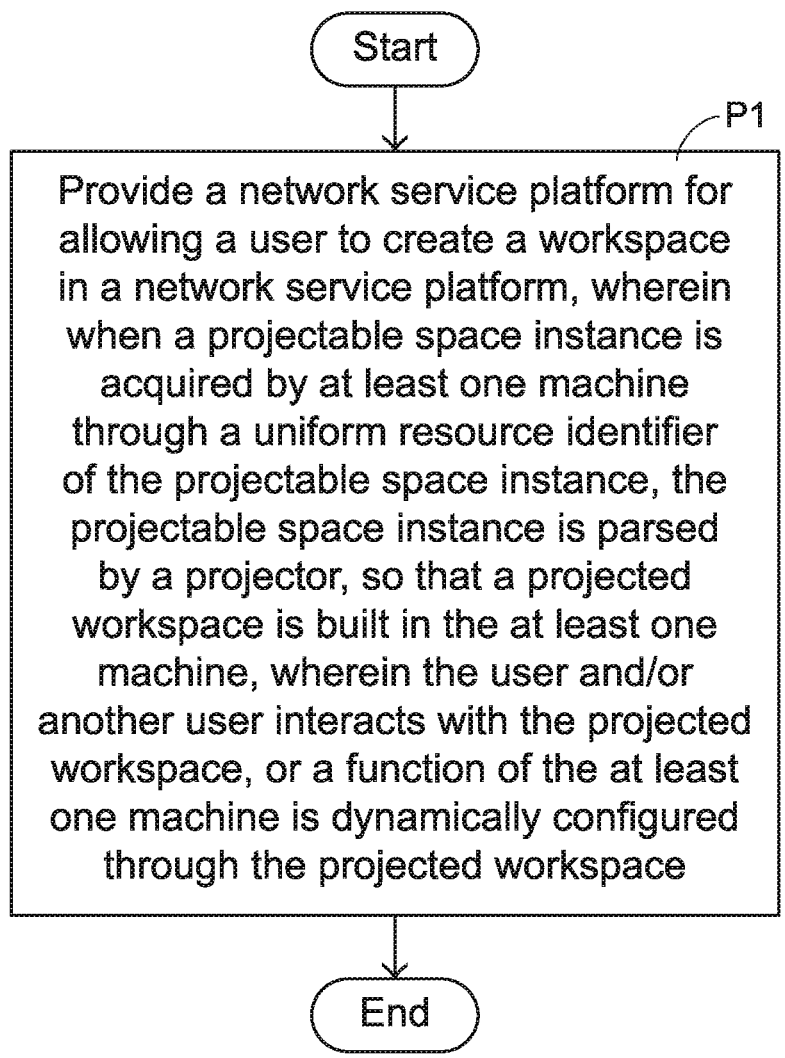
FIG. 7 is a flowchart illustrating a network service providing method according to an embodiment of the present invention.

The present invention provides a network service providing method. FIG. 7 is a flowchart illustrating a network service providing method according to an embodiment of the present invention. The network service providing method includes the following step. Firstly, a network service platform is provided for allowing a user to create a workspace in a network service platform. When a projectable space instance is acquired by at least one machine through a uniform resource identifier of the projectable space instance, the projectable space instance is parsed by a projector, so that a projected workspace is built in the at least one machine. The user and/or another user interacts with the projected workspace, or a function of the at least one machine is dynamically configured through the projected workspace. Hereinafter, the method of FIG. 7 will be further illustrated with reference to FIG. 8.

Figure 8:
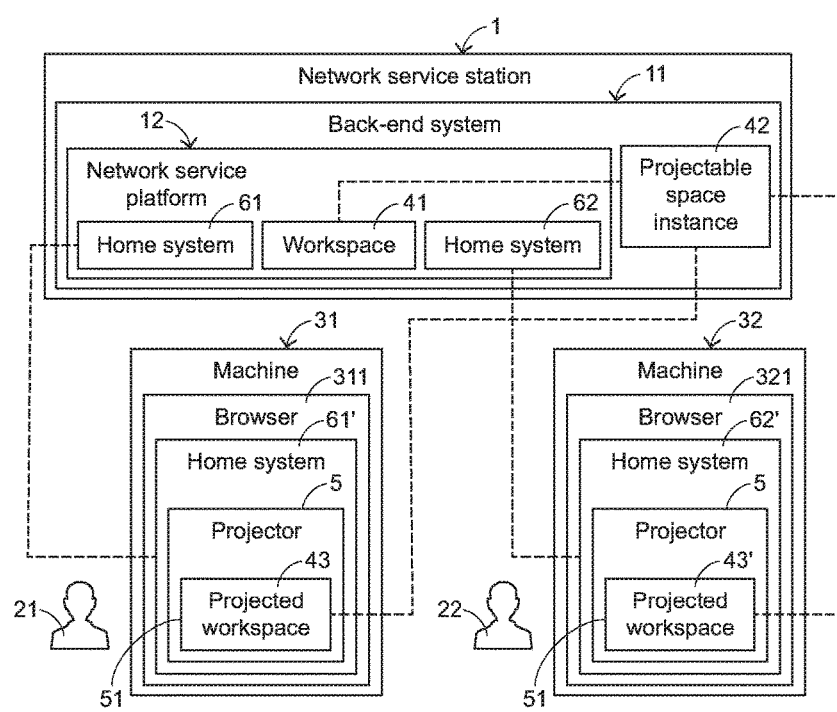
FIG. 8 schematically illustrates an implementation concept of a network service station using the method of FIG. 7.

FIG. 8 schematically illustrates an implementation concept of a network service station using the method of FIG. 7. The network service station 1 comprises a back-end system 11. The back-end system 11 can provide the functions of internet access, internet transit, domain name registration and hosting, dial-up access, leased line access and collocation, and so on. Moreover, the back-end system 11 is used for hosting a network service platform 12. The network service platform 12 allows a user 21 or another user 22 to create a workspace 41. For example, the network service station 1 is a commercial network service station, a community-owned network service station or a non-profit network service station.

When the user 21 or 22 opens the link of the network service platform 12 through the corresponding browser 311 or 321 of the machine 31 or 32, the user 21 or 22 accesses the network service platform 12 to use the services that are provided by the network service platform 12. For example, each of the machines 31 and 32 of the users 21 and 22 includes but is not limited to a computer (e.g., a desktop computer, a notebook computer or a tablet computer), a portable electronic device (e.g., a smart phone, a personal digital assistant or a wearable device) or any other internet accessible device. The way of allowing the user 21 or 22 to access the network service platform 12 is presented herein for purpose of illustration and description only. After the user 21 or 22 accesses the network service platform 12, the user 21 or 22 may create a workspace 41 in the network service platform 12. Moreover, a projectable space instance 42 for modeling the workspace 41 is provided to the back-end system 11. Consequently, at least one unified matter can be arbitrarily combined into the workspace 41 by the user 21 or 22 according to the practical requirements. That is, the unified matter to be combined is added to the projectable space instance 42.

After the user 21 or 22 loads the projectable space instance 42 from the back-end system 11 into the corresponding machine 31 or 32 through the URI of the projectable space instance 42, a projector 5 in the corresponding machine 31 or 32 builds a working environment 51 in the machine 31 or 32 for executing the corresponding projected workspace 43 or 43'. In addition, a microkernel corresponding to the projected workspace 43 or 43' is provided to the working environment 51 for equipping the unified matter that is compiled in the projectable space instance 42. After the projectable space instance 42 is loaded into the machine 31 or 32, the projector 5 starts to parse the projectable space instance 42. After the projectable space instance 42 is parsed, the projected workspace 43 or 43' is built in the working environment 51 of the machine 31 or 32. The projector 5 is provided by the back-end system 11, or the projector 5 is provided by the browser 311 or 321. Moreover, the projected workspaces 43 and 43' are shown on the browsers 311 and 321 in the form of web pages.

Preferably but not exclusively, the user 21 and the user 22 are allowed to create the corresponding home systems 61 and 62 in the network service platform 12 in order to host and manage the corresponding projected workspaces 43 and 43'. After the user 21 or 22 loads the projectable space instance 42 into the corresponding machine 31 or 32 through the URI of the projectable space instance 42, the user 21 or 22 may access the corresponding projected workspaces 43 and 43' even if the user 21 or 22 has no account or does not login into any existing account. For facilitating managing the projected workspaces 43 and 43', the above procedure may be modified. For example, after the users 21 and 22 access the projected workspaces 43 and 43', the users 21 and 22 may register or apply accounts to create their own home system 61 and 62 and provide the projected workspaces 43 and 43' to the home systems 61' and 62'. Consequently, the projected workspaces 43 and 43' are hosted by the home systems 61' and 62', respectively. Then, the users 21 and 22 may login into the network service platform 12 through their accounts. After the users 21 and 22 open their home systems 61' and 62', the users 21 and 22 can access the projected workspaces that have been added to the home systems 61' and 62' or the users 21 and 22 can create new workspace. Of course, the timing of registering or applying the user's account is not restricted. For example, when the link of the network service platform 12 is first opened through the browser of the machine, the user may directly register or apply the account in the network service platform 12 and create the corresponding home system. Moreover, the data of the user 21 and 22 for registering or applying the accounts are recorded in the back-end system 11. The home systems 61 and 62 provide the function of allowing the users 21 and 22 to manage the projected workspaces 43 and 43'. Preferably but not exclusively, the home systems 61 and 62 also provide the function of allowing the users 21 and 22 to manage their personal relationships and their personal properties. Moreover, "the descriptions of creating the home system" may be referred to the U.S. provisional patent application No. 62/102360, entitled "Home system on internet and method of providing the same". The detailed descriptions thereof are omitted.

Figure 9:
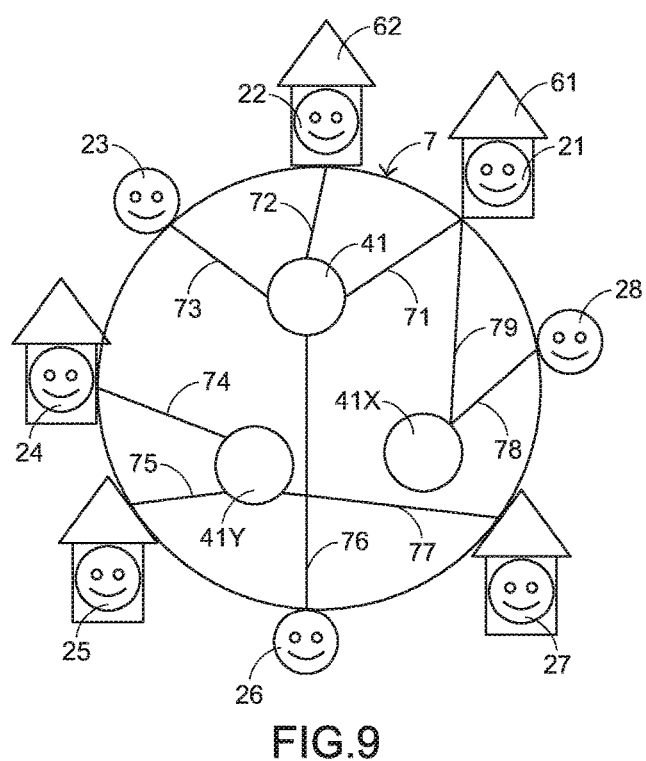
FIG. 9 schematically illustrates an implementation concept of establishing a social network using the method of FIG. 7.

Moreover, the network service platform 12 can be used to establish a social network. FIG. 9 schematically illustrates an implementation concept of establishing a social network using the method of FIG. 7. As shown in FIG. 9, the social network 7 is established to have plural workspaces 41, 41X and 41Y as the cores of the social network 7. After the workspaces 41, 41X and 41Y are projected, the workspaces 41, 41X and 41Y have direct-link relationships 71~79 with the corresponding users 21-28. Consequently, the workspaces 41, 41X and 41Y are associated with the corresponding users 21~28 through the corresponding direct-link relationships 71~79. Moreover, all of the users 21~28 have their corresponding home systems for hosting and managing the corresponding projected workspaces. For example, the user 21 has the home system 61, and the user 22 has the home system 62. The social network 7 is established through the plural direct-link relationships 71-79. Moreover, these direct-link relationships 71~79 are recorded in the back-end system 11.

Herein, "the descriptions of establishing the social network" may be referred to the China Patent Application No. 201510003852.0, entitled "Method of creating and expanding social network and storage medium using the method", and also referred to the PCT Patent No. PCT/CN2015/082687, which claims the benefit of priority to the China Patent Application No. 201510003852.0 and is entitled "Method for establishing social network and storage medium thereof". The detailed descriptions thereof are omitted.

Figure 10A:
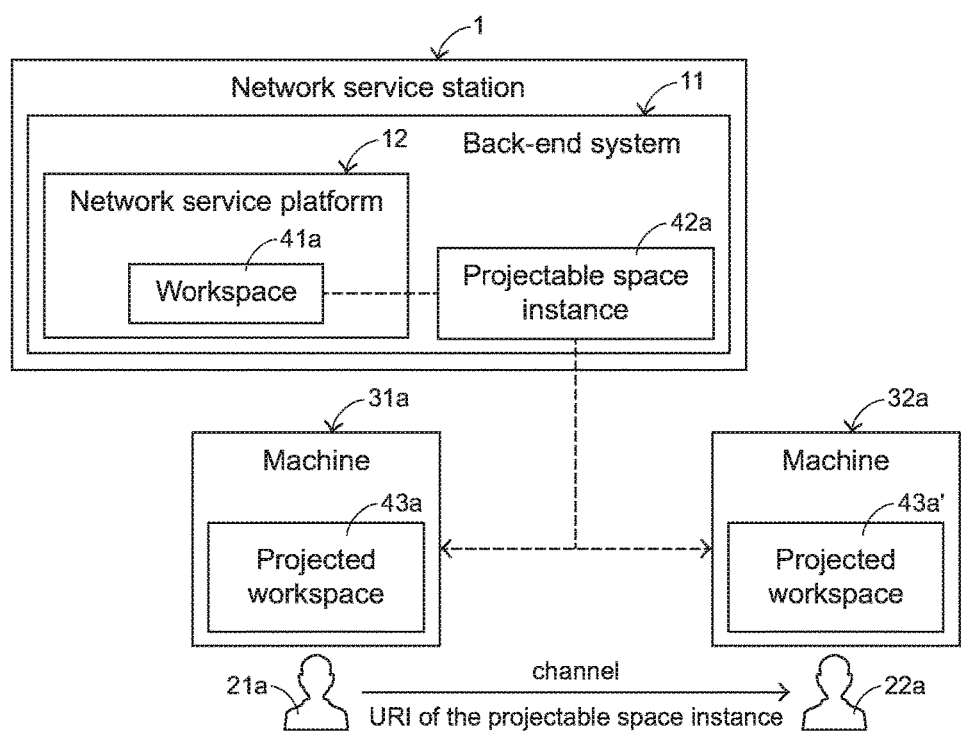
FIG. 10A is a schematic diagram illustrating the operating concepts of a first implantation example of the network service providing method according to the embodiment of the present invention.
Figure 10B:
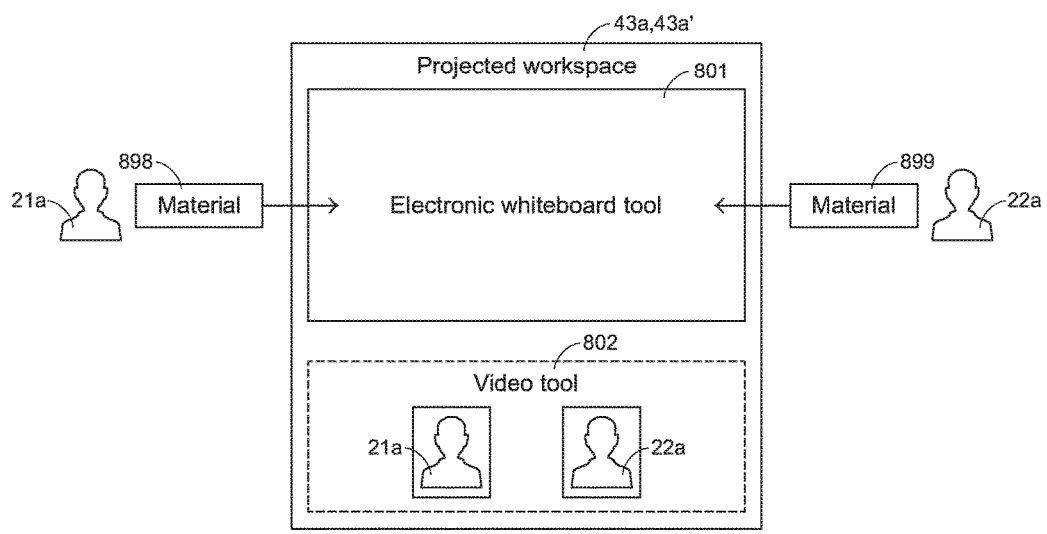
FIG. 10B is a schematic diagram illustrating the operating concepts of the projected workspace of FIG. 10A.

Some application examples of the network service providing method of the present invention will be described as follows. Please refer to FIGS. 10A and 10B. FIG. 10A is a schematic diagram illustrating the operating concepts of a first implantation example of the network service providing method according to the embodiment of the present invention. FIG. 10B is a schematic diagram illustrating the operating concepts of the projected workspace of FIG. 10A. In the first implementation example, the user 21a creates a workspace 41a in order to work collaboratively with another user 22a. For example, after the user 21a accesses the network service platform 12 to create a workspace 41a, the back-end system 11 generates a projectable space instance 42a. Moreover, according to the working demand, the required unified matters are combined together into the workspace 41a. That is, these unified matters are added to the projectable space instance 42a. In this embodiment, the unified matters at least comprise an electronic whiteboard tool 801 and a video tool 802. The electronic whiteboard tool 801 is used for achieving the collaborative working purpose. The video tool 802 is used for communication and discussion. It is noted that the examples of the unified matters are not restricted.

After the workspace 41a is created, the user 21a may send the URI of the workspace 41a (i.e., the URI of the projectable space instance 42a) to the user 22a through various channels. An example of the channel includes but is not limited to an e-mail, an intranet, a social network, a blog, a web site or chat communication software. Similarly, through the URI, the user 22a can load the projectable space instance 42a into the machine 32a which is operated by the user 22a. Consequently, the workspace 41a is projected to the machine 32a. Since the users 21a and 22a operate the projected workspaces 43a and 43a' through the corresponding machines 31a and 32a, the collaborative working purpose can be achieved.

While the users 21a and 22a work collaboratively, the users 21a and 22a may additionally add required unified matters (e.g., the collaborative working materials 898 and 899) to the projected workspaces 43a and 43a'. Moreover, while the users 21a and 22a work collaboratively, the unified matters that have been equipped in the projected workspaces 43a and 43a' may be removed by the users 21a and 22a according to the operating demand. If one of the users 21a and 22a performs an operation on the corresponding projected workspace 43a or 43a' to result in a change, the projected workspace 43a or 43a' of the other of the users 21a and 22a is synchronously changed according to a synchronization setting (e.g., the setting of creating the workspace 41a).

Herein, "the descriptions of performing the collaborative work through the workspace" may be referred to the China Patent Application No. 201510003717.6, entitled "Networking cooperation method and machine using such method", and also referred to the PCT Patent No. PCT/CN2015/083179, which claims the benefit of priority to the China Patent Application No. 201510003717.6 and is entitled "Networking cooperation method and machine using such method". The detailed descriptions thereof are omitted.

The above URI (i.e., the URI of the projectable space instance 42) may be contained in an interactive operation request. Moreover, the URI contains an instruction code. When the instruction code is executed in the projected workspace 43a or 43a', an interactive operation is performed. For example, the interactive operation request is a video conversion request, and the instruction code contains the data about the video conversion request. When the user 22a receives a video call notification in response to the video conversion request of the user 21a, the corresponding tool in the projected workspace 43a' is executed according to the instruction code. Meanwhile, the video conversion between the user 21a and the user 22a can be performed. Herein, "the examples of the interactive operation" may be referred to the U.S. Patent Application No. 62/109324, entitled "Method of performing an interactive operation". The detailed descriptions thereof are omitted.

Figure 11A:
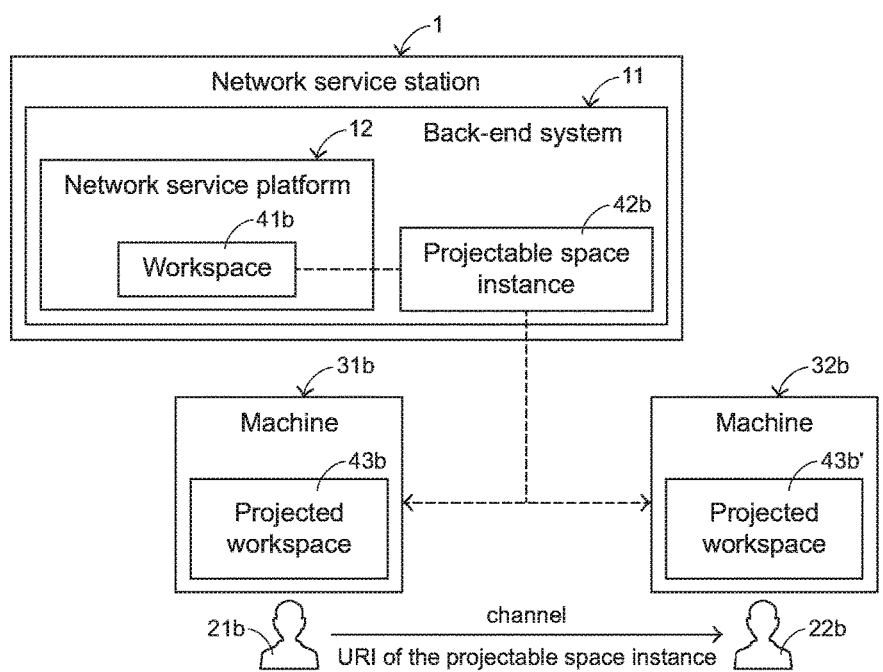
FIG. 11A is a schematic diagram illustrating the operating concepts of a second implantation example of the network service providing method according to the embodiment of the present invention.
Figure 11B:
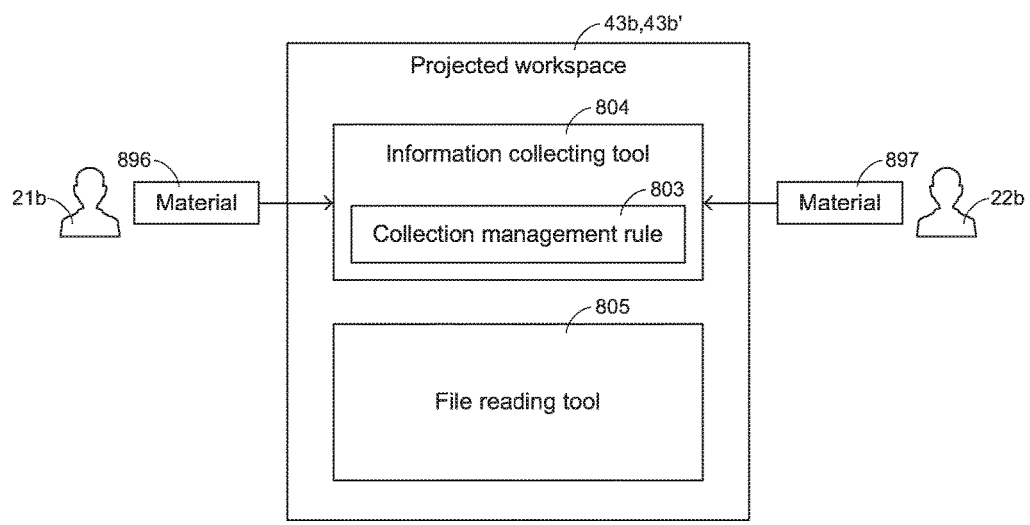
FIG. 11B is a schematic diagram illustrating the operating concepts of the projected workspace of FIG. 11A.

Please refer to FIGS. 11A and 11B. FIG. 11A is a schematic diagram illustrating the operating concepts of a second implantation example of the network service providing method according to the embodiment of the present invention. FIG. 11B is a schematic diagram illustrating the operating concepts of the projected workspace of FIG. 11A. In the second implementation example, the user 21b creates a workspace 41b in order to collect information with another user 22b. For example, after the user 21a accesses the network service platform 12 to create a workspace 41b, the back-end system 11 generates a projectable space instance 42b. Moreover, according to the information collecting demand, a collection management rule 803 and the required unified matters are combined together into the workspace 41b. That is, these unified matters are added to the projectable space instance 42b. In an embodiment, only the files in a specified format are collected according to the collection management rule 803. The unified tools at least comprise an information collecting tool 804 and a file reading tool 805. The information collecting tool 804 is used for converting the file format. The file reading tool 805 is used for reading the information from the information collecting tool 804. It is noted that the examples of the unified matters are not restricted.

After the workspace 41b is created, the user 21b may send the URI of the workspace 41b (i.e., the URI of the projectable space instance 42b) to the user 22b through various channels. Similarly, through the URI, the user 22b can load the projectable space instance 42b into the machine 32b which is operated by the user 22b. Consequently, the workspace 41b is projected to the machine 32b. Since the users 21b and 22b operate the projected workspaces 43b and 43b' through the corresponding machines 31b and 32b, the users 21b and 22b collects the materials 896 and 897 according to the collection management rule 803.

Herein, "the descriptions of collecting information through the workspace" may be referred to the China Patent Application No. 201510029235.8, entitled "Information collecting method and information collecting system using such method", and also referred to the PCT Patent No. PCT/CN2015/083163, which claims the benefit of priority to the China Patent Application No. 201510029235.8 and is entitled "Information collecting method and information collecting system using such method". The detailed descriptions thereof are omitted.

Figure 12:
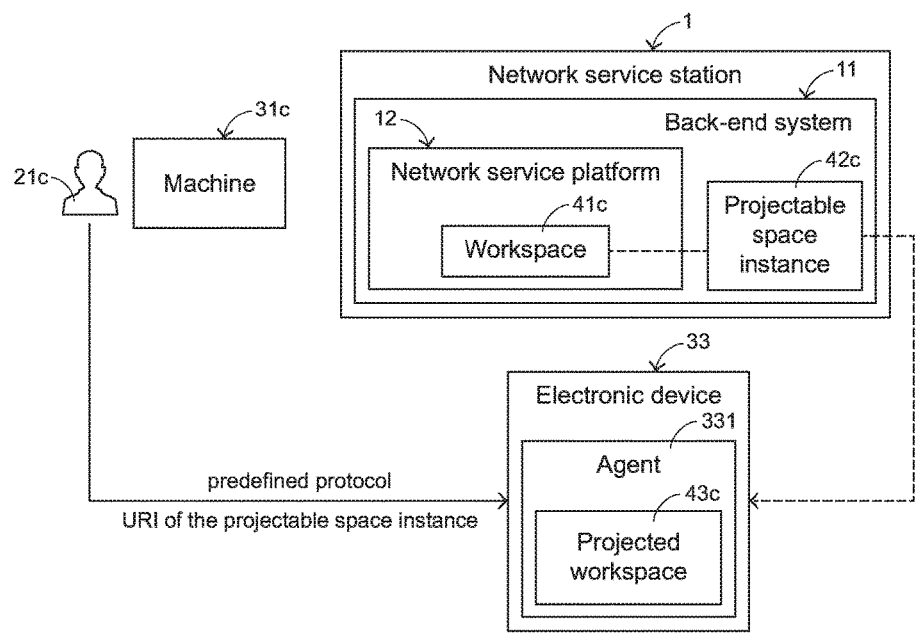
FIG. 12 is a schematic diagram illustrating the operating concepts of a third implantation example of the network service providing method according to the embodiment of the present invention.

FIG. 12 is a schematic diagram illustrating the operating concepts of a third implantation example of the network service providing method according to the embodiment of the present invention. In the third implementation example, the user 21c creates a workspace 41c in order to dynamically configuring functions of an electronic device 33. The electronic device 33 includes an agent 331. After the user 21c accesses the network service platform 12 to create a workspace 41c, the back-end system 11 generates a projectable space instance 42c. Moreover, according to the operating demand, the required unified matters are combined together into the workspace 41c. After the workspace 41c is created, the user 21c may send the URI of the workspace 41c (i.e., the URI of the projectable space instance 42c) to the electronic device 33 according to a predetermined protocol. Then, the agent 331 of the electronic device 33 receives and automatically opens the URI. Consequently, the projectable space instance 42c is loaded into the electronic device 33, and the workspace 41c is projected to the electronic device 33. Through the projected workspace 43c, the electronic device 33 can configure functions and/or operational processes according to the requirements of the user 21c. In an embodiment, the agent 331 of the electronic device 33 loads a projected to the electronic device 33. In another embodiment, the agent 33 is a projector.

Herein, "the descriptions of dynamically configuring functions of the electronic device" may be referred to the China Patent Application No. 201510003853.5, entitled "Method and system of dynamically configuring functions of machine", and also referred to the PCT Patent No. PCT/CN2015/083157, which claims the benefit of priority to the China Patent Application No. 201510003853.5 and is entitled "Method and system of dynamically configuring functions of machine". The detailed descriptions thereof are omitted.

Figure 13A:
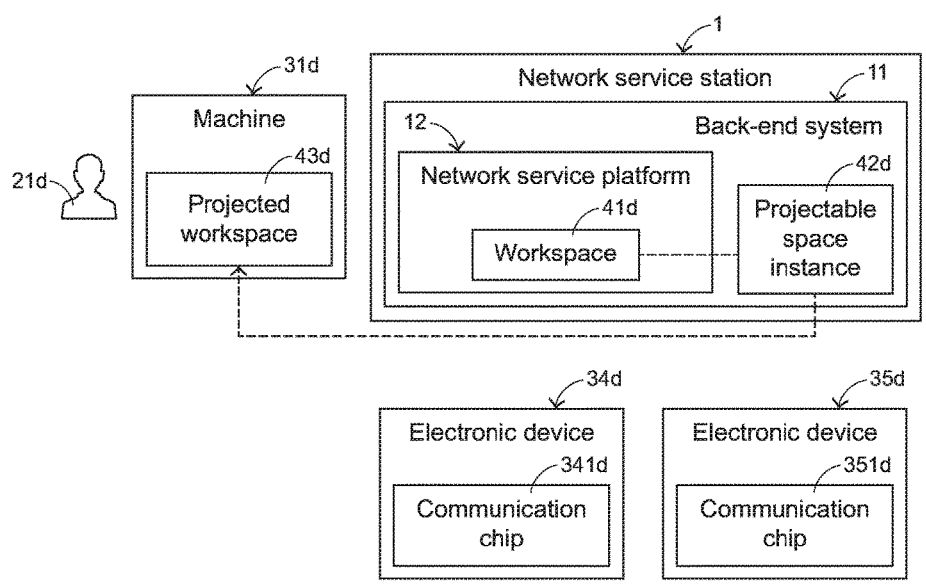
FIG. 13A is a schematic diagram illustrating the operating concepts of a fourth implantation example of the network service providing method according to the embodiment of the present invention.
Figure 13B:
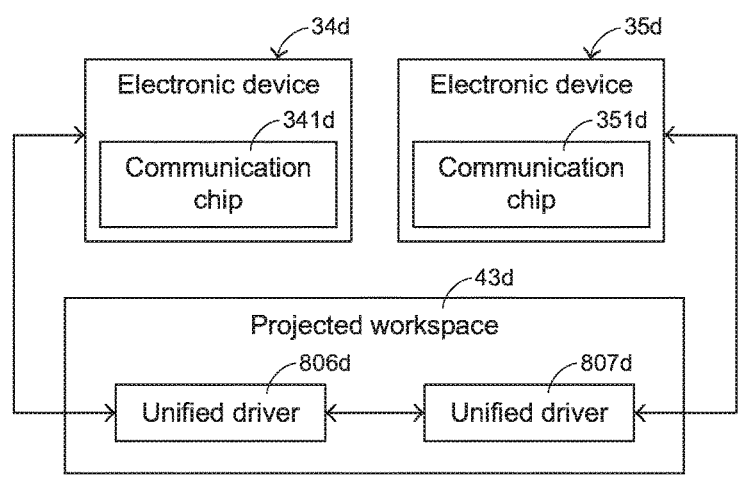
FIG. 13B is a schematic diagram illustrating the operating concepts of the projected workspace of FIG. 13A.

Please refer to FIGS. 13A and 13B. FIG. 13A is a schematic diagram illustrating the operating concepts of a fourth implantation example of the network service providing method according to the embodiment of the present invention. FIG. 13B is a schematic diagram illustrating the operating concepts of the projected workspace of FIG. 13A. In the fourth implementation example, the user 21d creates a workspace 41d in order to control plural networking electronic devices 34d and 35d (e.g., home appliances) through a machine 31d that is operated by the user 21d. For example, the machine 31d is a computer or a portable electronic device. The electronic devices 34d and 35d comprise communication chips 341d and 351d that are developed according to different communication protocols. For example, after the user 21d accesses the network service platform 12 to create a workspace 41d, the back-end system 11 generates a projectable space instance 42d. Moreover, according to the operating demand, the required unified tools are combined together into the workspace 41d. That is, these unified tools are added to the projectable space instance 42d. In this embodiment, the unified tools at least comprise unified drivers 806d and 807d corresponding to the electronic devices 34d and 35d. It is noted that the examples of the unified tools are not restricted.

After the workspace 41d is created, the user 21d may send the URI of the workspace 41d (i.e., the URI of the projectable space instance 42d) to any machine 31d (e.g., a computer or a portable electronic device). Through the URI, the user 21d can load the projectable space instance 42d into the machine 31d. Consequently, the workspace 41d is projected to the machine 31d. Under this circumstance, the user 21d can operate the projected workspace 43d through the machine 31d. Moreover, the unified driver 806d is in communication with the electronic device 34d, and the unified driver 807e is in communication with the electronic device 34d. Consequently, the purpose of controlling the plural electronic devices 34d and 35d is achieved.

Herein, "the descriptions of controlling electronic devices through the workspace" may be referred to the China Patent Application No. 201510061132.X, entitled "Method of controlling and managing electronic device and control system using same", and also referred to the PCT Patent No. PCT/CN2015/082688, which claims the benefit of priority to the China Patent Application No. 201510061132.X and is entitled "Method of controlling and managing electronic device and control system using same". The detailed descriptions thereof are omitted.

Figure 14A:
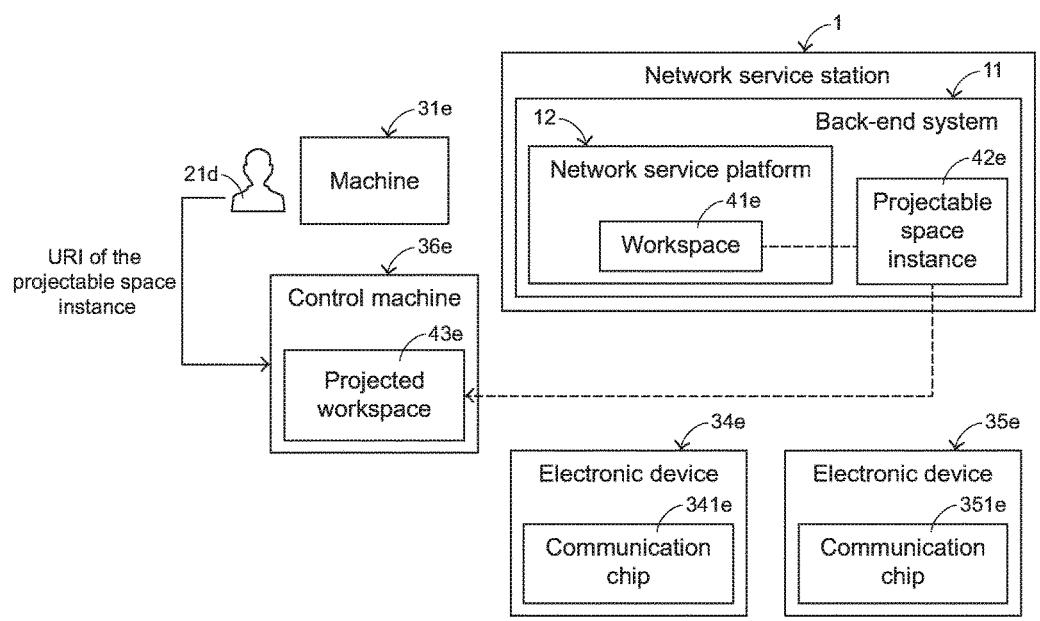
FIG. 14A is a schematic diagram illustrating the operating concepts of a fifth implantation example of the network service providing method according to the embodiment of the present invention.
Figure 14B:
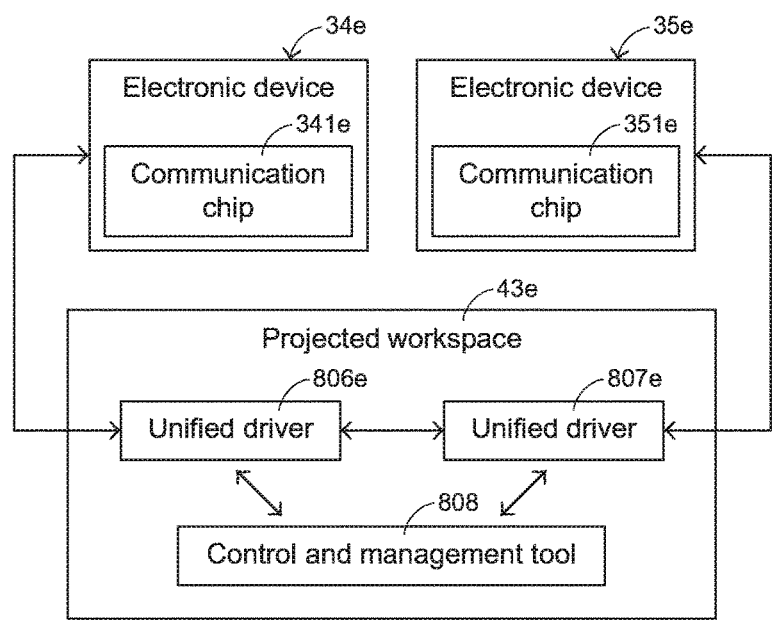
FIG. 14B is a schematic diagram illustrating the operating concepts of the projected workspace of FIG. 14A.

Please refer to FIGS. 14A and 14B. FIG. 14A is a schematic diagram illustrating the operating concepts of a fifth implantation example of the network service providing method according to the embodiment of the present invention. FIG. 14B is a schematic diagram illustrating the operating concepts of the projected workspace of FIG. 14A. In the fifth implementation example, the user 21e creates a workspace 41e in order to allow plural networking electronic devices 34e and 35e to work collaboratively. The electronic devices 34e and 35e are developed according to different communication protocols, or the electronic devices 34e and 35e comprise different comprise communication chips 341e and 351e. After the user 21e accesses the network service platform 12 to create a workspace 41e, the back-end system 11 generates a projectable space instance 42e. Moreover, according to the operating demand, the required unified tools are combined together into the workspace 41e. That is, these unified tools are added to the projectable space instance 42e. In this embodiment, the unified tools at least comprise unified drivers 806e and 807e corresponding to the electronic devices 34e and 35e and a control and management tool 808. The control and management tool 808 is used for controlling the collaborative work between these electronic devices 34e and 35e. It is noted that the examples of the unified tools are not restricted.

After the workspace 41e is created, the user 21e may send the URI of the workspace 41e (i.e., the URI of the projectable space instance 42e) to any control machine 36e (e.g., a computer or a portable electronic device). Through the URI, the user 21e can load the projectable space instance 42e into the control machine 36e. Consequently, the workspace 41e is projected to the control machine 36e. When the projected workspace 43e in the control machine 36e is operated, these electronic devices 34e and 35e can work collaboratively. Moreover, when the projected workspace 43e is operated, the control and management tool 808 realizes the status information of the electronic device 34e through the unified driver 806e and controls the electronic device 35e to perform a task corresponding to the status information through the unified driver 807e.

Herein, "the descriptions of controlling a group of electronic devices through the workspace" may be referred to the China Patent Application No. 201510061134.9, entitled "Group control and management among electronic devices", and also referred to the PCT Patent No. PCT/CN2015/082502, which claims the benefit of priority to the China Patent Application No. 201510061134.9 and is entitled "Group control and management among electronic devices". The detailed descriptions thereof are omitted.

Figure 15A:
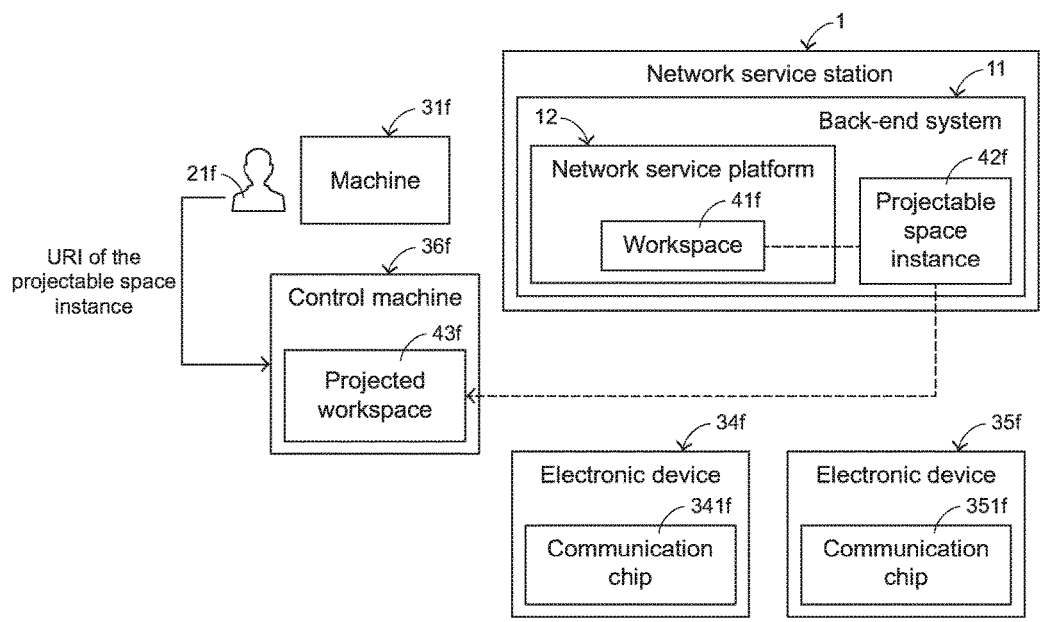
FIG. 15A is a schematic diagram illustrating the operating concepts of a sixth implantation example of the network service providing method according to the embodiment of the present invention.
Figure 15B:
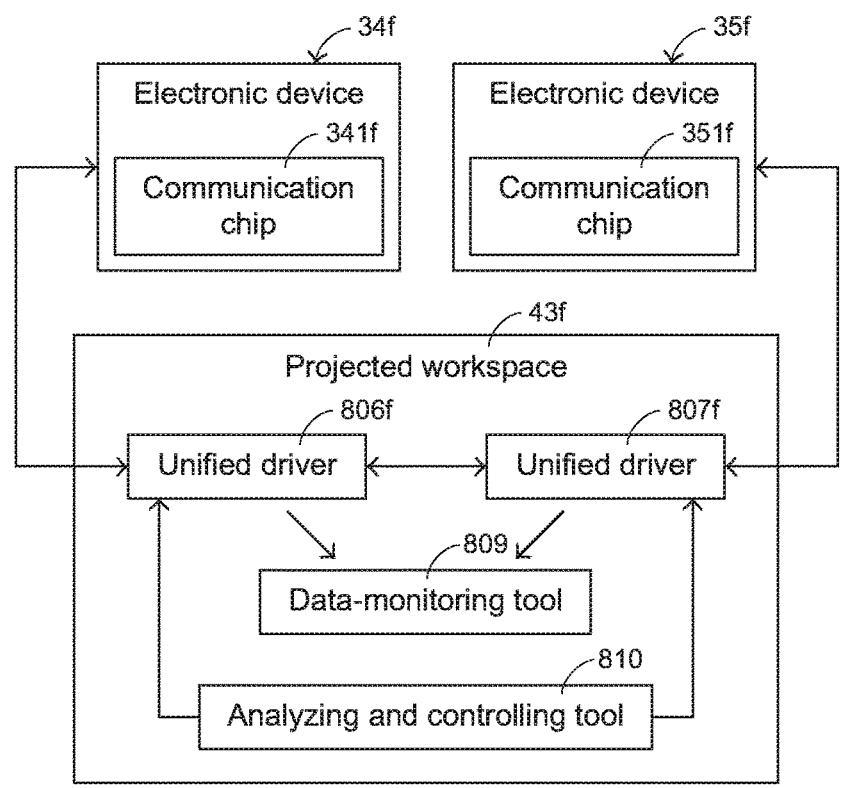
FIG. 15B is a schematic diagram illustrating the operating concepts of the projected workspace of FIG. 15A.

Please refer to FIGS. 15A and 15B. FIG. 15A is a schematic diagram illustrating the operating concepts of a sixth implantation example of the network service providing method according to the embodiment of the present invention. FIG. 15B is a schematic diagram illustrating the operating concepts of the projected workspace of FIG. 15A. In the sixth implementation example, the user 21f creates a workspace 41f in order to allow plural networking electronic devices 34f and 35f to work collaboratively. The electronic devices 34f and 35f are developed according to different communication protocols, or the electronic devices 34f and 35f comprise different comprise communication chips 341f and 351f. After the user 21f accesses the network service platform 12 to create a workspace 41f, the back-end system 11 generates a projectable space instance 42f. Moreover, according to the operating demand, the required unified tools are combined together into the workspace 41f. That is, these unified tools are added to the projectable space instance 42f. In this embodiment, the unified tools at least comprise unified drivers 806f and 807f corresponding to the electronic devices 34f and 35f, a data-monitoring tool 809 and an analyzing and controlling tool 810. The data-monitoring tool 809 is used for acquiring the data from the electronic devices 34f and 35f. The analyzing and controlling tool 810 is used for analyzing the data from the data-monitoring tool 809 and controlling the electronic devices 34f and 35f. It is noted that the examples of the unified tools are not restricted.

After the workspace 41f is created, the user 21f may send the URI of the workspace 41f (i.e., the URI of the projectable space instance 421) to any control machine 36f (e.g., a computer or a portable electronic device). Through the URI, the user 21f can load the projectable space instance 42f into the control machine 36f. Consequently, the workspace 41f is projected to the control machine 36f. When the projected workspace 43f in the control machine 36f is operated, these electronic devices 34f and 35f can work collaboratively. Moreover, when the projected workspace 43f is operated, the data-monitoring tool 809 acquires the data of the electronic device 34f through the unified driver 806f and/or acquires the data of the electronic device 35f through the unified driver 807f. Then, the analyzing and controlling tool 810 analyzes the data from the data-monitoring tool 809. According to the analyzing result, the analyzing and controlling tool 810 controls the electronic device 34f through the unified driver 806f and/or controls the electronic device 35f through the unified driver 807f.

Herein, "the descriptions of controlling a group of electronic devices through the workspace" may be referred to the China Patent Application No. 201510060730.5, entitled "Method of controlling and managing electronic device and control method using the same", and also referred to the PCT Patent No. PCT/CN2015/083162, which claims the benefit of priority to the China Patent Application No. 201510060730.5 and is entitled "Adaptive control and management for electronic device". The detailed descriptions thereof are omitted.

Figure 16A:
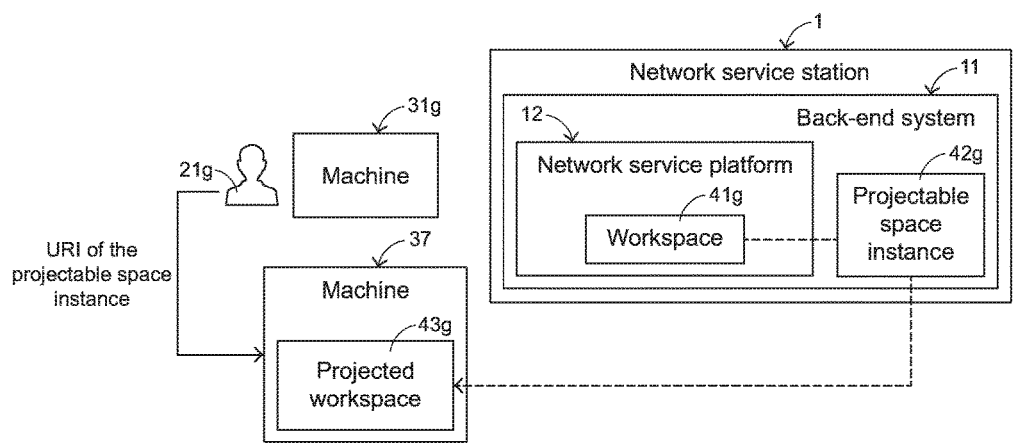
FIG. 16A is a schematic diagram illustrating the operating concepts of a seventh implantation example of the network service providing method according to the embodiment of the present invention.
Figure 16B:
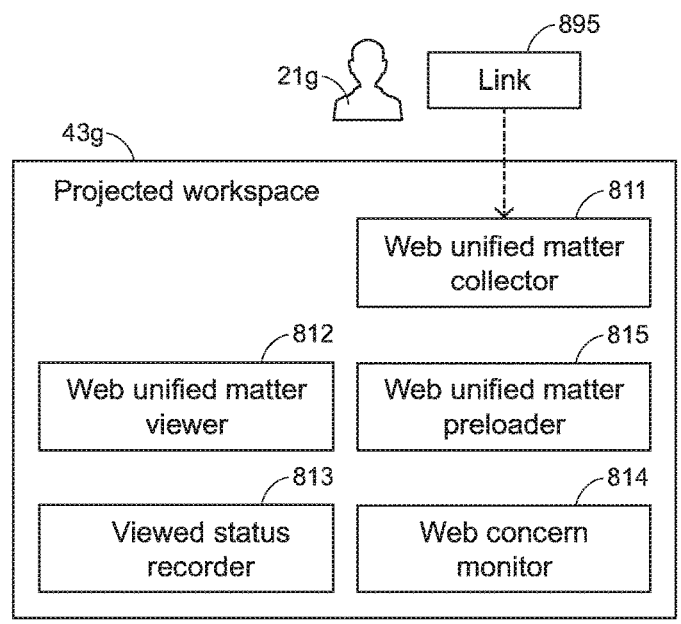
FIG. 16B is a schematic diagram illustrating the operating concepts of the projected workspace of FIG. 16A.

Please refer to FIGS. 16A and 16B. FIG. 16A is a schematic diagram illustrating the operating concepts of a seventh implantation example of the network service providing method according to the embodiment of the present invention. FIG. 16B is a schematic diagram illustrating the operating concepts of the projected workspace of FIG. 16A. In the seventh implementation example, the user 21g creates a workspace 41g in order to trigger and preload concerned web pages. After the user 21g accesses the network service platform 12 to create a workspace 41g, the back-end system 11 generates a projectable space instance 42g. Moreover, according to the operating demand, the required unified tools are combined together into the workspace 41g. That is, these unified tools are added to the projectable space instance 42g. In an embodiment, the unified tools at least comprises a web unified matter collector 811, a web unified matter viewer 812, a viewed status recorder 813, a web concern monitor 814 and a web unified matter preloader 815. The web unified matter collector 811 is used for acquiring the webpage snapshot of the concerned web page. The web unified matter viewer 812 is used for accessing the web unified matter. When the web unified matter is accessed, the viewed status recorder 813 counts a concern factor of the web unified matter such as the frequency of accessing the web unified matter, the duration of accessing the web unified matter or the time period of consecutively accessing the web unified matter twice. The web concern monitor 814 is used for monitoring the concern factor of the web unified matter. When the concern factor of the web unified matter complies with a monitoring rule, the web unified matter preloader 815 performs a preloading process.

After the workspace 41g is created, the user 21g may send the URI of the workspace 41g (i.e., the URI of the projectable space instance 42g) to any machine 37 (e.g., a computer or a portable electronic device). Through the URI, the user 21f can load the projectable space instance 42f into the machine 37. Consequently, the workspace 41g is projected to the machine 37. When a link 895 of a web page is added to the projected workspace 43g by the user 21g, the concerned web pages and associated web pages are preloaded to the projected workspace 43g according to the concerned condition of the concerned web pages.

Herein, "the descriptions of a triggering method for preloading concerned web pages" may be referred to the China Patent Application No. 201510085607.9, entitled "Triggering method and system of preloading concerned web pages", and also referred to the PCT Patent No. PCT/CN2015/082686, which claims the benefit of priority to the China Patent Application No. 201510085607.9 and is entitled "Triggering method of preloading concerned web pages". The detailed descriptions thereof are omitted.

From the above descriptions, the present invention provides a network service providing method and a network service station using the method. The present invention has the following advantages. Firstly, the network service providing method allows any information, any tool or any service to be arbitrarily combined into a unified environment and compatible with each other. Moreover, through a single user interface, the user can operate specified functions of different network service platforms, operating systems and software components. Moreover, after the user receives a URI of a projectable space instance through the widely-used channel of the user, the user accesses the unified environment (i.e., the projected workspace) through the network service station. Since the working environment provided by the present invention is highly transmittable, plural users and/or machines can work collaboratively. Moreover, it is not necessary to additionally install application software or application program in the machines of the users. Since the barriers in the internet are largely reduced according to the technologies of the present invention, the purpose of having no international limitation in the network will be successfully achieved.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A network service providing method, comprising a step of providing a network service platform to allow a first user to create a workspace in the network service platform, wherein at least one unified matter is allowed to be added to or removed from a projectable space instance that is used to model the workspace, and the projectable space instance is installed in a back-end system, wherein when the projectable space instance is acquired by at least one machine through a uniform resource identifier (URI), the projectable space instance is parsed by a projector, so that a projected workspace corresponding to the workspace is built in the at least one machine, wherein the first user and/or a second user interacts with the projected workspace, or a function of the at least one machine is dynamically configured through the projected workspace, wherein the projectable space instance is instantiated by a unified script, and the unified script is defined to arrange the at least one unified matter, wherein the at least one unified matter includes at least one Matterizer, at least one unified tool, and/or at least one unified information unit, wherein the at least one unified information unit and/or the at least one unified tool is inputted into the projected workspace through the at least one Matterizer, and wherein the at least one unified matter is produced after at least one original information obtained from at least one information source is unified by the at least one Matterizer.

2. The network service providing method according to claim 1, wherein the unified script is declared by a document type definition (DTD), an extensible markup language (XML) Schema, a structured language, or a structured protocol.

3. The network service providing method according to claim 1, wherein the projectable space instance is an object, an extensible markup language document, or an instance which is instantiated with a structured language or a structured protocol; or
the projector is provided by the network service platform or a browser; or
the projector is loaded into an engine that provides a compatible environment to execute the projector.

4. The network service providing method according to claim 1, wherein
at least one original tool corresponding to the at least one unified tool includes a utility, a widget, an agent, an application, a service, or any executable element accessible from a corresponding machine or a server; or
the at least one original information corresponding to the at least one unified information unit includes a file, a web page, a database row, a policy, a rule, a policy, or any information accessible from a corresponding machine or a server.

5. The network service providing method according to claim 1, wherein the at least one unified matter is combined into the workspace when the workspace is created by the first user; or
the at least one unified matter is allowed to be added to or removed from the projected workspace when at least one of the first user and the second user interacts with the projected workspace.

6. The network service providing method according to claim 1, wherein the at least one machine acquires the uniform resource identifier (URI) through at least one channel.

7. The network service providing method according to claim 6, wherein the at least one channel includes an e-mail, a social network, a blog, a website, or a chat communication software.

8. The network service providing method according to claim 1, wherein the at least one unified matter comprises the at least one unified tool to drive at least one electronic device, wherein when at least one of the first user and the second user operates the at least one machine, the at least one unified tool drives the at least one electronic device to execute at least one task; or
the at least one unified matter comprises a control and management tool and a plurality of unified tools to drive a plurality of electronic devices, wherein when the projected workspace built in the at least one machine is operated, the control and management tool realizes at least one status information of at least one electronic device of the plurality of electronic devices through the plurality of unified tools and controls other electronic devices of the plurality of electronic devices to perform at least one task corresponding to the at least one status information; or
the at least one unified matter comprises an analyzing and controlling tool, a data-monitoring tool and the at least one unified tool to drive at least one electronic device, wherein when the projected workspace built in the at least one machine is operated, the data-monitoring tool acquires a data of the at least one electronic device through the at least one unified tool, and the analyzing and controlling tool analyzes the data, wherein the analyzing and controlling tool controls the at least one electronic device through the at least one unified tool according to a result of the analyzing of the data; or
the network service platform further allows the first user and/or the second user to establish a home system to host and manage the projected workspace; or
when the first user interacts with the projected workspace, a direct-link relationship between the workspace and the first user is established through the network service platform, wherein a social network is established according to a plurality of direct-link relationships.

9. The network service providing method according to claim 1, wherein the at least one unified matter is added to the projectable space instance according to an operational demand, and the projected workspace is equipped with the at least one unified matter according to the projectable space instance, so that at least two of the first user, the second user, and the at least one machine work collaboratively.

10. The network service providing method according to claim 9, wherein if one of the first user and the second user performs an operation on the projected workspace to result in a change, the projected workspace of the other of the first user and the second user is synchronously changed according to a synchronization setting.

11. The network service providing method according to claim 1, wherein a process of preloading a concerned web page is triggered through the projected workspace; or
a collection management rule about the workspace is added to the projectable space instance, and the at least one unified matter is collected by the projected workspace according to the collection management rule; or
the first user and/or the second user is allowed to create a home system in the network service platform, wherein the projected workspace, a personal relationship, and/or a personal property is managed and/or accessed by the home system; or
the uniform resource identifier (URI) contains an instruction code, wherein when the instruction code is executed in the projected workspace, an interactive operation is performed.

12. A network service station comprising a back-end system, wherein the back-end system hosts a network service platform to allow a first user to create a workspace, a projectable space instance to model the workspace is installed in the back-end system, and at least one unified matter is allowed to be added to or removed from a projectable space instance, wherein when the projectable space instance is acquired by at least one machine through a uniform resource identifier (URI), the projectable space instance is parsed by a projector, so that a projected workspace corresponding to the workspace is built in the at least one machine, wherein the first user and/or a second user interacts with the projected workspace, or a function of the at least one machine is dynamically configured through the projected workspace, wherein the projectable space instance is instantiated by a unified script, and the unified script is defined to arrange the at least one unified matter, wherein the at least one unified matter includes at least one Matterizer, at least one unified tool, and/or at least one unified information unit, wherein the at least one unified information unit and/or the at least one unified tool is inputted into the projected workspace through the at least one Matterizer, and wherein the at least one unified matter is produced after at least one original information obtained from at least one information source is unified by the at least one Matterizer.

13. The network service station according to claim 12, wherein
the projectable space instance is an object, an extensible markup language document, or an instance which is instantiated with a structured language or a structured protocol; or
the projector is provided by the network service platform or a browser; or
the projector is loaded into an engine that provides a compatible environment to execute the projector.

14. The network service station according to claim 12, wherein
at least one original tool corresponding to the at least one unified tool includes a utility, a widget, an agent, an application, a service, or any executable element accessible from a corresponding machine or a server; or
the at least one original information corresponding to the at least one unified information unit includes a file, a web page, a database row, a policy, a rule, a policy, or any information accessible from a corresponding machine or a server.

15. The network service station according to claim 12, wherein the at least one unified matter is combined into the workspace when the workspace is created by the first user; or
the at least one unified matter is allowed to be added to or removed from the projected workspace when at least one of the first user and the second user interacts with the projected workspace; or
the at least one machine acquires the uniform resource identifier (URI) through at least one channel; or
the at least one unified matter comprises the at least one unified tool to drive at least one electronic device, wherein when at least one of the first user and the second user operates the at least one machine, the at least one unified tool drives the at least one electronic device to execute at least one task; or the at least one unified matter comprises a control and management tool and a plurality of unified tools to drive a plurality of electronic devices, wherein when the projected workspace built in the at least one machine is operated, the control and management tool realizes at least one status information of at least one electronic device of the plurality of electronic devices through the plurality of unified tools and controls other electronic devices of the plurality of electronic devices to perform at least one task corresponding to the at least one status information; or
the at least one unified matter comprises an analyzing and controlling tool, a data-monitoring tool and the at least one unified tool to drive at least one electronic device, wherein when the projected workspace built in the at least one machine is operated, the data-monitoring tool acquires a data of the at least one electronic device through the at least one unified tool, and the analyzing and controlling tool analyzes the data, wherein the analyzing and controlling tool controls the at least one electronic device through the at least one unified tool according to a result of the analyzing of the data.

16. The network service station according to claim 12, wherein the network service platform further allows the first user and/or the second user to establish a home system to host and manage the projected workspace; or
when the first user interacts with the projected workspace, a direct-link relationship between the workspace and the first user is established through the network service platform, wherein a social network is established according to a plurality of direct-link relationships; or
the at least one unified matter is added to the projectable space instance according to an operational demand, and the projected workspace is equipped with the at least one unified matter according to the projectable space instance, so that at least two of the first user, the second user, and the at least one machine work collaboratively.

17. The network service station according to claim 12, wherein a process of preloading a concerned web page is triggered through the projected workspace; or
a collection management rule about the workspace is added to the projectable space instance, and the at least one unified matter is collected by the projected workspace according to the collection management rule.

* * * * *